US007064561B2

(12) United States Patent
Morimoto

(10) Patent No.: US 7,064,561 B2
(45) Date of Patent: Jun. 20, 2006

(54) RESISTANCE TYPE SENSOR

(75) Inventor: Hideo Morimoto, Yamatokooriyama (JP)

(73) Assignee: Nitta Corporation (JP)

( * ) Notice: Subject to any disclaimer, the term of this patent is extended or adjusted under 35 U.S.C. 154(b) by 153 days.

(21) Appl. No.: 10/613,745

(22) Filed: Jul. 3, 2003

(65) Prior Publication Data

US 2004/0056669 A1 Mar. 25, 2004

(30) Foreign Application Priority Data

Jul. 5, 2002 (JP) .............................. 2002-196992

(51) Int. Cl.
*G01R 27/00* (2006.01)

(52) U.S. Cl. ..................................... 324/691
(58) Field of Classification Search ............... 324/691, 324/722, 724, 716; 73/862.473, 862.474; 338/47; 84/723; 178/18.05; 345/174; 200/512
See application file for complete search history.

(56) References Cited

U.S. PATENT DOCUMENTS

| 3,960,044 | A | * | 6/1976 | Nagai et al. ............ 84/719 |
| 4,322,983 | A | * | 4/1982 | Sado .................. 73/862.68 |
| 4,852,443 | A | * | 8/1989 | Duncan et al. ............ 84/733 |
| 6,234,031 | B1 | * | 5/2001 | Suga .................. 73/862.474 |
| 2002/0067241 | A1 | * | 6/2002 | Armstrong ................ 338/2 |
| 2004/0000195 | A1 | * | 1/2004 | Yanai et al. ............. 73/717 |
| 2004/0104735 | A1 | * | 6/2004 | Morimoto ............... 324/660 |

2004/0189340 A1 * 9/2004 Okada .................... 324/765

FOREIGN PATENT DOCUMENTS

| CN | 1460910 A | 12/2003 |
| JP | 2003-331681 | 11/2003 |
| WO | WO 95/16975 | 6/1995 |

OTHER PUBLICATIONS

Chinese Office Action dated Feb. 4, 2005 for Application No. 03147148X (4 pages) (referencing CN1460910A).
English Translation of Chinese Office Action dated Feb. 24, 2005 for Application No. 03147148X (4 pages).
Patent Abstracts of Japan (from esp@cenet) for JP2003 331681 which is Japanese Counterpart Application to CN1460910A; Input Device and Electronic Device with Same; 1 page.

* cited by examiner

*Primary Examiner*—Anjan Deb
(74) *Attorney, Agent, or Firm*—Osha Liang LLP

(57) ABSTRACT

In a resistance type sensor of the present invention, a sensor unit having variable contact resistances and a wakeup switch formed in two layers is produced by folding a FPC forming thereon pressure-sensitive resistive inks, a displacement electrode connected to ground, and a displacement electrode held at a power-supply voltage Vcc. Accordingly, whenever operation is applied to an operating button, the displacement electrode and the displacement electrode are reliably contacted with each other, first, and, then, resistance values of the variable contact resistances are changed while the displacement electrodes are kept in their contacted state. This enables the operation applied to the operating button to be detected reliably.

10 Claims, 18 Drawing Sheets

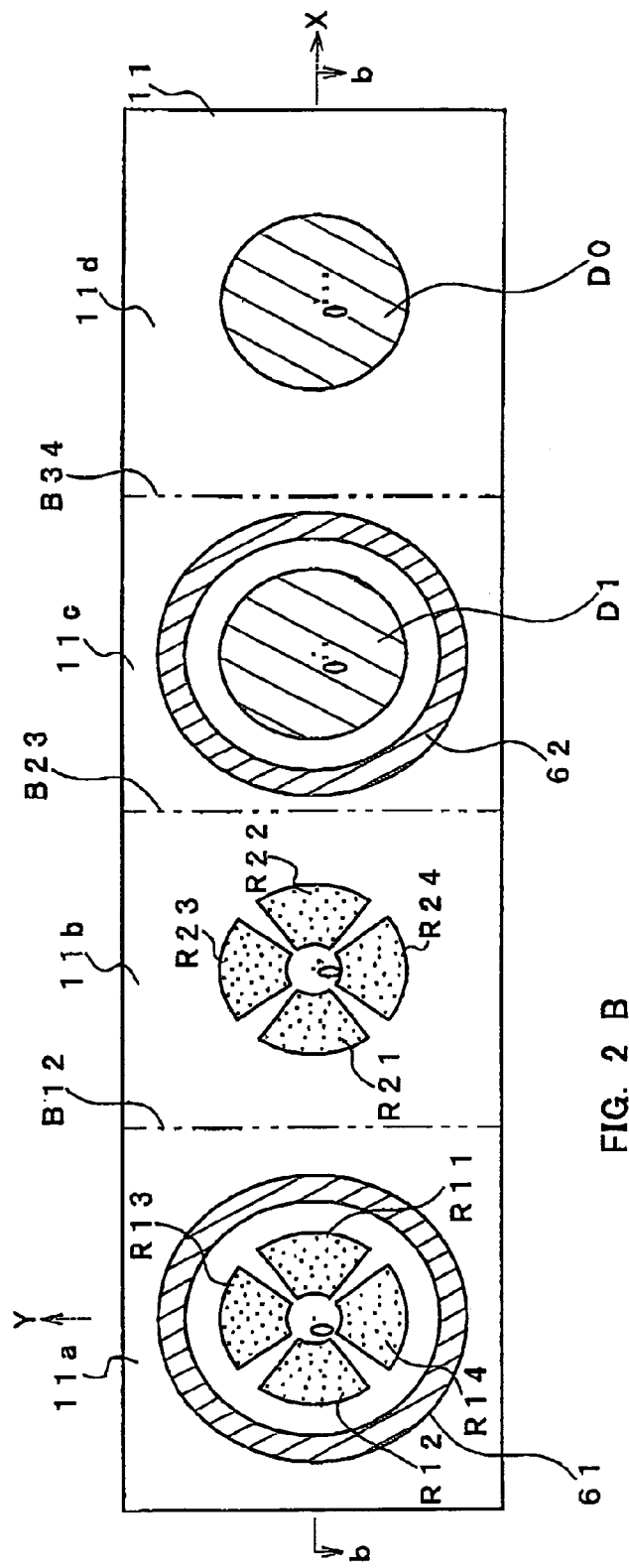
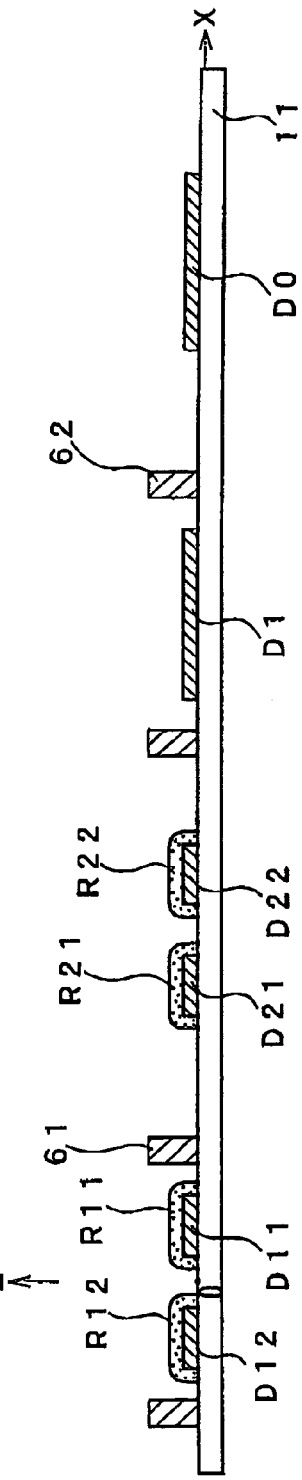
FIG. 2A
FIG. 2B

RESISTANCE TYPE SENSOR

BACKGROUND ON INVENTION

1. Field of the Invention

The present invention relates to a resistance type sensor suitably used for detecting a force applied from outside.

2. Description of the Related Art

A resistance type sensor is in general use as a device for converting magnitude and direction of a force applied by an operator into electric signal. For example, a device having the resistance type sensor for inputting operation of multi-dimensional direction incorporated as a so-called joystick is used as an input device of a mobile phone.

A resistance type sensor can be used to input an operation having a specified dynamic range as a magnitude of a force applied by an operator. It is also used as a 2-dimensional or 3-dimensional sensor capable of dividing an applied force into dimensional components, for detection of the applied force.

For example, Japanese Laid-open (Unexamined) Patent Publication No. Hei 6(1994)-347850 filed by the applicant of this application discloses a resistance type sensor having a pressure-sensitive member interposed between a pair of electrodes. It discloses a technique of detecting magnitude of the force on the basis of changes of the resistance value between the pair of electrodes when the operation of the sensor is performed (when a force from outside is applied to the sensor).

In this resistance type sensor, since electric current flows through the circuit, regardless of the operational state of the sensor, electric power is always consumed. Preferably, when operation is not applied to the resistance type sensor for a long time, the flow of the electric current through the sensor circuit should be stopped by taking appropriate measures.

For example, in the case where an input device having a switch function of selectively switching between the on-state and the off-state is used with a microcomputer control system, it is general that when the input device is not operated (when no switching operation is performed) after passage of a predetermined time, the resistance type sensor is automatically switched to a sleep mode (power-saving mode) in which power consumption is reduced as much as possible. The sleep mode is not canceled automatically until the input device is operated. An output from the input device is either of signal at a high level near a power-supply voltage and signal at a low level near a ground potential. When the input device is operated, the output varies in level, switching from a low level to a high level or from a high level to a low level. This means that in this input device, the output after operation surely varies across a threshold voltage which is about half the power-supply voltage from its initial state before operation. Thus, the operation applied can be surely detected by monitoring the output from this input device and thereby the sleep mode can be properly cancelled.

This resistance type sensor is suitably used for a device that can detect magnitude of a force applied from outside (e.g. a force sensor), but is not suitable for a device having the switch function of selectively switching between two different modes (e.g. on-state and off-state). Accordingly, when this resistance type sensor is built in equipment as a device having a multidirectional switch function, the resistance type sensor can hardly be used as it is and is required to add switch functions corresponding to the respective directions.

In addition, in this resistance type sensor, the output from the sensor may not vary across the threshold voltage depending on magnitude of a force applied from outside. In this case, the operation applied cannot surely be detected by simply monitoring the output from the sensor. Due to this, in the case where the resistance type sensor is automatically switched to the sleep mode when the input device is not operated after passage of a predetermined time, as in the case of the input device having the switch function mentioned above, the sleep mode may not be canceled properly. Thus, even when the input device is not operated for a long time, this resistance type sensor may not be switched to the sleep mode, so that the electric power is consumed wastefully during that time.

SUMMARY OF THE INVENTION

It is an object of the present invention to provide a resistance type sensor applicable to either of a device for detecting magnitude of a force for each direction and a device having switch function.

It is another object of the present invention to provide a resistance type sensor capable of reducing power consumption by switching to a sleep mode when used with a microcomputer control system.

In accordance with the first aspect of the present invention, there is provided a resistance type sensor comprising a detective member, a first electrode being opposite to the detective member, a second electrode arranged between the detective member and the first electrode, the second electrode being opposite to the first electrode and be displaceable toward the first electrode increasingly with displacement of the detective member, a pressure-sensitive resistive member arranged between the first electrode and the second electrode, one or more first switching electrodes opposite to the detective member, and one or more second switching electrodes arranged between the detective member and the first switching electrode(s) in such a relation as to be opposite to the first switching electrode(s) and also spaced apart from the first switching electrode(s), the second switching electrodes being contactable with the first switching electrode(s) increasingly with displacement of the detective member, wherein the resistance type sensor is capable of recognizing the displacement of the detective member on the basis of a detection of a change in resistance value between the first electrode and the second electrode of each pair.

According to this construction, since the displacement of the detective member can be recognized by detecting changes of resistance value between the first electrode and the second electrode, magnitude of a force applied to the detective member from outside can be recognized. Also, since the presence or absence of contact between the first switching electrode and the second switching electrode can be recognized, this can be used as a switch function. Therefore, the resistance type sensor of the present invention can be used as a device having the function of outputting the displacement of the detective member (magnitude of a force applied to the detective member from outside) as signal (analog signal), and/or a device having a switch function. Thus, this resistance type sensor has the function as a composite device useable as either of the former device and the latter device, so that the need to re-create the sensor for either of the purposes mentioned above is eliminated.

The expression that "displacement of the detective member can be recognized" has substantially the same meaning as the expression that "a force applied to the detective member from outside can be recognized". In the case where the first and second switching electrodes incorporated in the sensor of the present invention are used as the switch function, they may be used as a mere switch to switch between the on-state and the off-state, fully independently of change of resistance value between the first electrode and the second electrode, as well as a wakeup switch to detect the operation applied to the detective member, for changing the resistance value between the first electrode and the second electrode.

The resistance type sensor of the present invention may further comprise a first substrate disposed on the side opposite to the second electrode with respect to the first electrode and having the first electrode on its surface, a second substrate disposed on the side opposite to the first electrode with respect to the second electrode and having the second electrod on its surface, a first switching substrate disposed on the side opposite to the second switching electrode(s) with respect to the first switching electrode(s) and having the first switching electrode(s) on its surface, and a second switching substrate disposed on the side opposite to the first switching electrode(s) with respect to the second switching electrode(s) and having the second switching electrode(s) on its surface. According to this construction, since the first and second electrodes and the first and second switching electrodes are arranged on the substrate, those electrodes can be set in proper position on the substrate easily, thus providing simplified production process of the sensor.

In the resistance type sensor of the present invention, the first and second switching electrodes may be disposed in such a relation that they are overlapped with the first and second electrodes with respect to a displacement direction of the detective member. According to this construction, since the first and second switching electrodes and the first and second electrodes are disposed to be overlapped with each other with respect to the displacement direction of the detective member (for example in two layers with respect to a vertical direction), an area required for the electrodes to be incorporated in the sensor is reduced comparatively. This enables the sensor to be reduced in size.

In the resistance type sensor of the present invention, the first substrate, the second substrate, the first switching substrate and the second switching substrate may be formed by a single common substrate having flexibility. According to this construction, the sensor is produced by arranging the respective electrodes on a single common substrate, first, and, then, folding the common substrate. This can provide simplified production process of the sensor. In addition, since the sensor unit of the sensor of the present invention is formed as a unit (unitized), even when appearance of the sensor or the detecting part is modified, a commonly available sensor unit can be obtained. Further, in this case, since the sensor unit can be placed on a circuit board on which for example a circuit pattern (wiring) is formed, an effective wring area of the circuit board need not be reduced.

In the resistance type sensor of the present invention, the first electrode, the second electrode, the first switching electrode, and the second switching electrode are all arranged on one side of the common substrate. According to this construction, since all the electrodes are arranged on the common substrate, the production process of the sensor can be simplified further and the production costs can be reduced further.

In the resistance type sensor of the present invention, the first and second switching electrodes may be disposed to be closer to the detective member than the first and second electrodes. According to this construction, the interval between the first switching electrode and the second switching electrode comes to be liable to change before the interval between the first electrode and the second electrode changes, which is preferable when the switch function between the first switching electrode and the second switching electrode is given priority use.

In the resistance type sensor of the present invention, either of the first and second switching electrodes is connected to ground and the other of the first and second switching electrodes are held at different potential from ground potential, and wherein the first and second switching electrodes come to be increasingly contacted with each other with the displacement of the detective member, followed by displacement of the second electrode. According to this construction, when operation is applied to the detective member (when the second electrode is displaced), the second switching electrode is displaced increasingly with displacement of the detective member and is brought into contact with the first switching electrode reliably, first. Then, the second electrode is displaced while the first switching electrode and the second switching electrode are kept in their contacted state. It should be noted here that the output from the switching electrode held at potential different from ground potential, out of the first and second switching electrodes of the resistance type sensor in the contacted state of the first and second switching electrodes or in the non-contacted state of the same, is either of signal at a high level near a potential at which the switching electrode is kept and signal at a low level near the ground potential. Due to this, for example when the both switching electrodes are switched from their non-contacted state to their contacted state, the output therefrom surely varies across a threshold voltage. Thus, the operation applied to the resistance type sensor 1 can be reliably detected by monitoring the output from the switching electrode of the resistance type sensor and, thus, the sleep mode can be reliably cancelled. This can provide the result that in the resistance type sensor as well, when the operation is not applied to the detective member for many hours, the power consumption can be cut by switching the resistance type sensor to the sleep mode.

It is to be noted that the expression of "potential different from ground potential" indicates "a potential having an absolute value larger than an absolute value of a specific threshold voltage".

In the resistance type sensor of the present invention, there may be provided two or more groups of the first and second electrodes or two or more groups of the first and second switching electrodes. According to this construction, the resistance type sensor can be used as a device having the function of recognizing a multidimensional force and/or a device having the switch function by using the respective groups to recognize forces for different directions.

BRIEF DESCRIPTION OF THE DRAWINGS

Other and further objects, features and advantages of the invention will appear more fully from the following description taken in connection with the accompanying drawings in which:

FIG. 2 is a view of an arrangement of a plurality of electrodes and spacers included in the resistance type sensor of FIG. 1.

DESCRIPTION OF THE PREFERRED EMBODIMENTS

In the following, certain preferred embodiments of the present invention are described with reference to the accompanying drawings.

Figure 1:
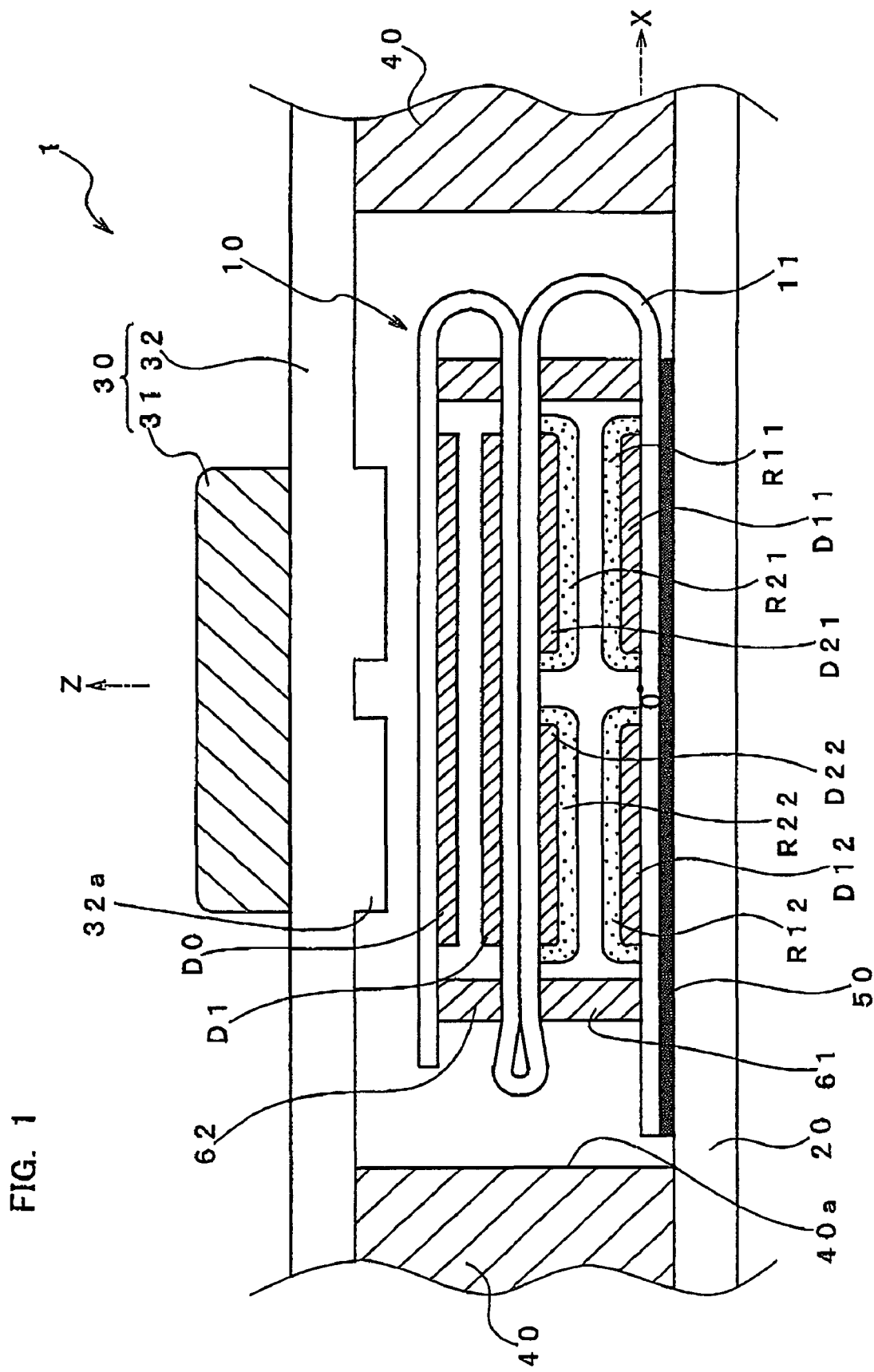
FIG. 1 is a schematic sectional view of a resistance type sensor according to the first embodiment of the present invention.

First, the construction of a resistance type sensor 1 according to the first embodiment of the present invention is described with reference to FIGS. 1 and 2. FIG. 1 is a schematic sectional view of the resistance type sensor according to the first embodiment of the present invention. FIG. 2 is a view of an arrangement of a plurality of electrodes and spacers included in the resistance type sensor of FIG. 1.

The resistance type sensor 1 has a sensor unit 10, a fixing plate 20, an operating portion 30 including an operating button 31 to which a force is applied from outside by an operator, and a supporting member 40 for fixedly supporting the operating portion 30 to the fixing plate 20. A lower surface of the sensor unit 10 is bonded to a surface of the fixing plate 20 through adhesive 50.

The sensor unit 10 has a flexible printed circuit board (FPC) 11, a plurality of conductive lands D11–D14 formed on the FPC 11 (only D11 and D12 are shown in FIG. 1), pressure-sensitive resistive inks (pressure-sensitive resistive member) R11–R14 (only R11 and R12 are shown in FIG. 1), displacement electrodes D0, D1, and spacers 61, 62.

For convenience of explanation, a XYZ three-dimensional coordinate system is defined herein, as illustrated, and the placement of the parts will be described with reference to this coordinate system. That is to say, in FIG. 1, the origin O is defined at the center of the conductive lands D11–D14 on th FPC 11 adhesive bonded onto the fixing plate 20 (See FIG. 2), letting the X-axis be in a horizontally rightward direction, the Y-axis be in a depth direction orthogonal to the vertical direction when viewed from the paper, and the Z-axis be in a vertically upward direction. Therefore, a surface of the FPC 11 (or details, a first surface 11a mentioned later) on which the conductive lands D11–D14 are formed defines a plane XY, and the Z-axis passes generally center positions of the sensor unit 10 and the operating button 31.

First, a schematic configuration of the sensor unit 10 and a producing method thereof will be described with reference to FIG. 2. FIG. 2(A) shows a top view of the FPC 11 and FIG. 2(B) shows a sectional view of FIG. 2(A) taken along line b—b of FIG. 2(A).

The FPC 11 is a flat-plate-like member of a generally rectangular shape and is formed, for example, of flexible material such as PET film. A front surface of the FPC 11 (a front side of a paper as viewed in FIG. 2(A) or an upper side of the same as viewed in FIG. 2(B)) is divided into a first surface 11a, a second surface 11b, a third surface 11c, and a fourth surface 11d. The first surface 11a to the fourth surface 11d divided by boundary lines B12, B23, and B34 indicated by chain double-dashed lines in FIG. 2 have a generally square shape and substantially the same area. As mentioned below, each boundary line B12, B23, and B34 serves as a folding line along which the FPC 11 is folded.

The origin O is defined at around the center of the first surface 11a of the FPC 11, as mentioned above. When the FPC 11 is folded to complete the sensor unit 10, the Z-axis passes through the second surface 11b, th third surface 11c and the fourth surface 11d at around their centers, as shown in FIG. 1. Accordingly, in the following description, the second surface 11b, the third surface 11c and the fourth surface 11d are taken here to have points O', O", and O''' corresponding to the original point O at around the centers thereof, respectively.

As shown in FIG. 2(A), the conductive lands D11–D14 of a general sector form corresponding to the X-axis positive direction, the X-axis negative direction, the Y-axis positive direction, and the Y-axis negative direction, respectively, and positioned symmetrically with respect to the original point O are formed on the first surface in a screen printing using conductive ink using silver or carbon as raw material.

The pressure-sensitive resistive inks R11–R14 are screen-printed on the conductive lands D11–D14 formed on the first surface 11a so that they are laid over their respective conductive lands. Of the conductive lands D11–D14 and the pressure-sensitive resistance inks R11–R14, only the pressure-sensitive resistive inks R11–R14 laid over their respective conductive lands are depicted in FIG. 2(A).

The pressure-sensitive resistive inks R11–R14 are material of which resistance values vary depending on pressure and contact-surface area. The pressure-sensitive resistive inks R11–R14 that may be used include, for example, a mixture prepared by mixing conductive ink containing graphite, vinyl resin and butylcellosolve acetate in insulating ink containing titanium dioxide filler, vinyl resin binding agent, and butylcellosolve acetate solvent. The resistance values of the pressure-sensitive resistive inks can be varies easily by changing a relative proportion between the insulating component used as a main component substance and the conductive component.

As in the case of the first surface 11a, the conductive lands D21–D24 of a general sector form corresponding to the X-axis positive direction, the X-axis negative direction, the Y-axis positive direction, and the Y-axis negative direction, respectively, and positioned symmetrically with respect to the original point O' are formed on the second surface 11b in a screen printing using conductive ink using silver or carbon as raw material. The pressure-sensitive resistive inks R21–R24 are screen-printed on the conductive lands D21–D24 so that they are laid over their respective conductive lands.

When the FPC 11 is folded to complete the sensor unit 10, the pressure-sensitive resistive ink R11 (conductive land D11) and the pressure-sensitive resistive ink R21 (conductive land D21) come to be opposite to each other, and the pressure-sensitive resistive in R12 (conductive land D12) and the pressure-sensitive resistive ink R22 (conductive land D22) come to be opposite to each other. Thus, in FIG. 2, the conductive land D21 and the pressure-sensitive resistive member R21 are oriented to the X-axis negative direction, and the conductive land D22 and the pressure-sensitive resistive member R22 are oriented to the X-axis positive direction.

A displacement electrode D1 of a generally circular form with center at the point O'' is formed on the third surface 11c in a screen printing using conductive ink using silver or carbon as raw material. The displacement electrode D1 has a diameter substantially equal to a diameter of a circl formed by connecting outer circular arcs of th conductive lands D11–D14. Likewise, a displacement electrode D0 of a generally circular form with center at the point O''' is formed on the fourth surface 11d in a screen printing using conductive ink using silver or carbon as raw material. The displacement electrode D0 has substantially the same diameter as that of the displacement electrode D1.

An annular spacer 61 disposed around the outside of the conductive lands D11–D14 is disposed on the first surface 11a. As shown in FIG. 2(B), the spacer 61 has a height (thickness) larger than the sum of thicknesses of the conductive land D11–D14, pressure-sensitive resistive member R11–R14, conductive land D21–D24, and pressure-sensitive resistive member R21–R24. Also, an annular spacer 62 disposed around the outside of the displacement electrode D1 is disposed on the third surface 11c. The spacer 62 has a height (thickness) larger than the sum of thicknesses of the displacement electrodes D1 and D0.

The spacers 61, 62 may be formed by adhesive bonding a thin film to their respective surfaces or by printing a conductive or non-conductive thick film thereto, or by an adhesive layer used to fix the FTC 11 when folded.

In addition to the conductive lands D11–D14, D21–D24 and the displacement electrodes D1, D0, circuit patterns (wiring) and conductive layers of connector terminals are also formed on the FPC 11, through not shown in FIG. 2. The conductive lands D11–D14, D21–D24 and the displacement electrodes D1, D0 formed on the FPC 11 are connected to a microcomputer 5 or external circuits through those circuit patterns and terminals, as mentioned later.

In the manufacture of the sensor unit 10, after the electrodes are formed on the first surface 11a to the fourth surface 11d on the FPC 11, respectively, the second surface 11b to the fourth surface 11d are folded along the boundary lines. Specifically, the first surface 11a and the second surface 11b are folded along the boundary line B12 defined therebetween so that the second surface 11b and the first surface 11a are opposite to each other. Then, a region of the second surface 11b outside of the pressure-sensitive resistive inks R21–R24 is brought into contact with an upper end of the spacer 61 provided on the first surface 11a and is adhesive bonded thereto in that state. In this state, since the spacer 61 has the height mentioned above, it defines a specified space between the each upper surface of the pressure-sensitive resistive ink R11–R14 on the first surface 11a and the each lower surface of the pressure-sensitive resistive ink R21–R24 on the second surface 11b (which correspond to the respective upper surfaces of the same in the state of FIG. 2(B) in which the FPC 11 is not yet folded) of each pair when the operating button 31 is in the state of being not yet operated.

Thereafter, the third surface 11c and the fourth surface 11d are folded back along the boundary line B23 defined therebetween, and then the back side of the second surface 11b and the back side of the third surface 11c are adhesive bonded to each other.

Finally, the fourth surface 11d is folded to the third surface 11c along the boundary line B34 defined therebetween so that the fourth surface 11d and the third surface 11c are opposite to each other. Then, a region of the fourth surface 11d outside of the displacement electrode D0 is brought into contact with an upper end of the spacer 62 provided on the third surface 11c, and are adhesive bonded thereto in that state. In this state, since the spacer 62 has the height mentioned above, it defines a specified space between the upper surface of the displacement electrode D1 and the lower surface of the displacement electrode D0 (which correspond to the upper surfaces of the same in the state of FIG. 2(B) in which the FPC 11 is not yet folded) when the operating button 31 is in the state of being not yet operated.

By folding the FPC 11 along the boundary lines B12, B23 and B34 defined between adjacent surfaces in the manner mentioned above, the sensor unit 10 is completed as shown in FIG. 1. Accordingly, the resistance type sensor 1 is provided with four variable contact resistances R1–R4 which correspond to the X-axis positive direction, the X-axis negative direction, the Y-axis positive direction and the Y-axis negative direction, respectively, and are formed by the pressure-sensitive resistive inks R11–R14, R21–R24 and the displacement electrodes D0, D1. It is also provided with a common wakeup switch S1 for the four directions mentioned above (See FIG. 4).

In the illustrated sensor unit 10, the base side of the first surface 11a is fixed to the fixing plate 20 by adhesive 50, as mentioned above. The sensor unit 10 may be fixed, for example, to the fixing plate 20 by any other proper means than the adhesive 50, without limiting to the adhesive 50.

In the resistance type sensor 1, the conductive lands D11, D21 are arranged to correspond to the X-axis positive direction, and the conductive lands D12, D22 are arranged to correspond to the X-axis negative direction, so that they are both used for detecting the components of the force from outside for the X-axis directions. The conductive lands D13, D23 are arranged to correspond to the Y-axis positive direction, and the conductive lands D14, D24 are arranged to correspond to the Y-axis negative direction, so that they are both used for detecting the components of the force from outside for the Y-axis directions. A pair of conductive lands D11, D21 and a pair of conductive lands D12, D22 are arranged in isolation with respect to the X-axis direction so as to be symmetric with respect to the Y-axis. A pair of conductive lands D13, D23 and a pair of conductive lands D14, D24 are arranged in isolation with respect to the Y-axis direction so as to be symmetric with respect to the X-axis.

The FPC 11 may be formed of resin such as polyimide or equivalent. The conductive lands D11–D14, D21–D24, the displacement electrodes D0, D1, and the circuit pattern may be formed by forming copper foil or solder layer on the resin such as polyimide or equivalent.

The operating portion 30 includes the operating button 31 disposed over the sensor unit 10 and a keypad base 32 for supporting the operating button 31 to the fixing plate 20 through the supporting member 40, as shown in FIG. 1. The operating portion 30 is formed of material having elasticity such as silicon rubber.

The operating button 31 is a member of a generally disk-like form having a specified thickness. The operating button 31 has a diameter slightly smaller than that of a circl formed by connecting outer circular arcs of the conductive lands D11–D14 on the FPC 11. Th operating button 31 has, on an upper surface thereof, arrows to indicate operating directions (moving directions of a cursor). The arrows are oriented to the X-axis positive/negative direction and the Y-axis positive/negative direction, respectively, or are formed to correspond to the conductive lands D11–D14, respectively.

The keypad base 32 has an annular protrusion 32a formed on a bottom thereof in a position corresponding to the operating button 31 bonded to the upper surface of the keypad base. The protrusion 32a has an outer diameter substantially equal to that of the operating button 31 and has an inner diameter substantially equal to a circle formed by connecting inner circular arcs of the conductive lands D11–D14.

The supporting member 40 is a flat-plate-like member disposed on the fixing plate 20 and has an opening 40a of larger than the sensor unit 10 formed on the fixing plate 20 at a position corresponding to the sensor unit 10. The fixing plate 20 serves to support the sensor unit 10 and the operating portion 30 and has preferably sufficient rigidity.

Figure 3:
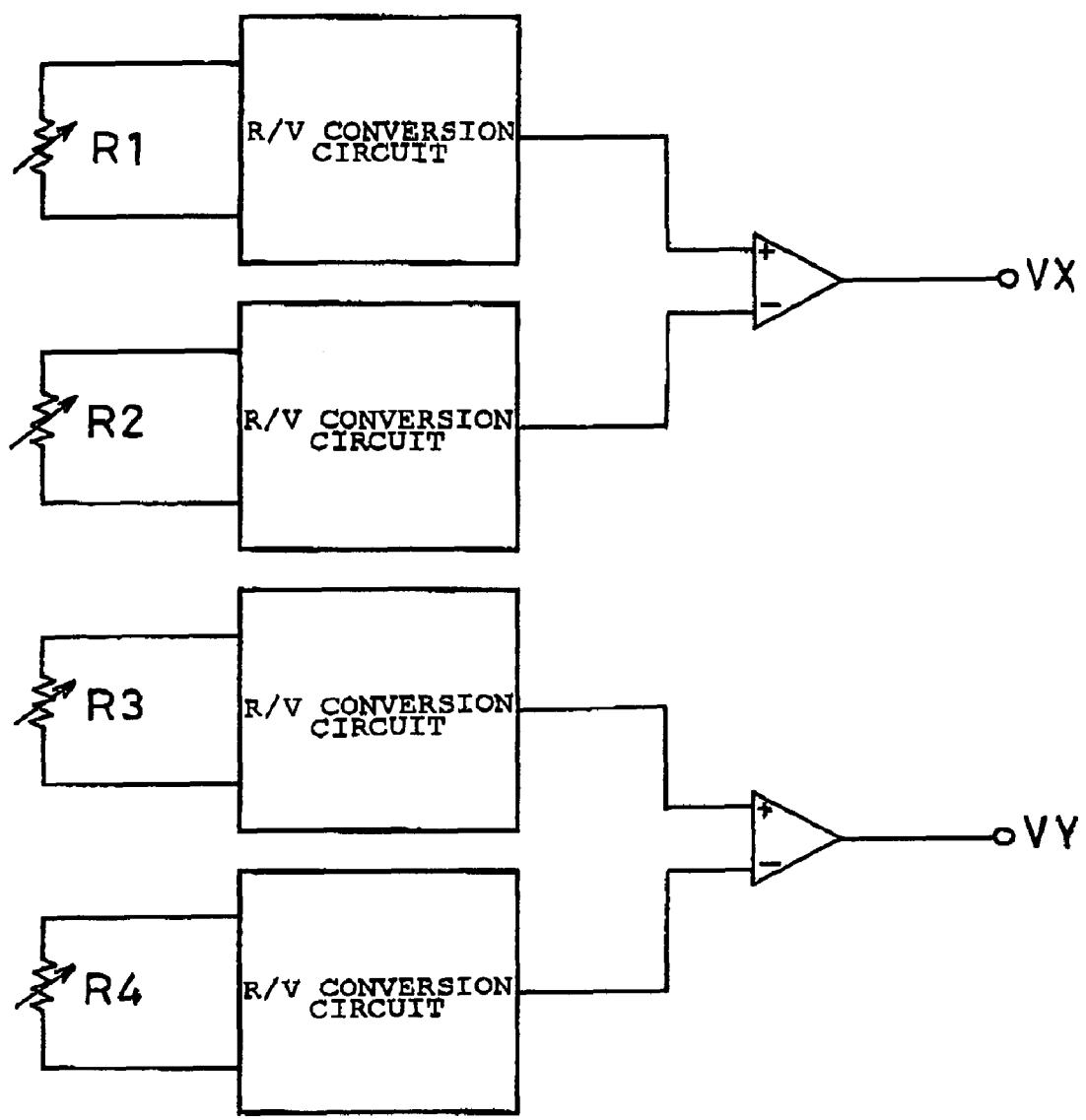
FIG. 3 is a schematic diagram of a try of the resistance type sensor shown in FIG. 1.
Figure 4:
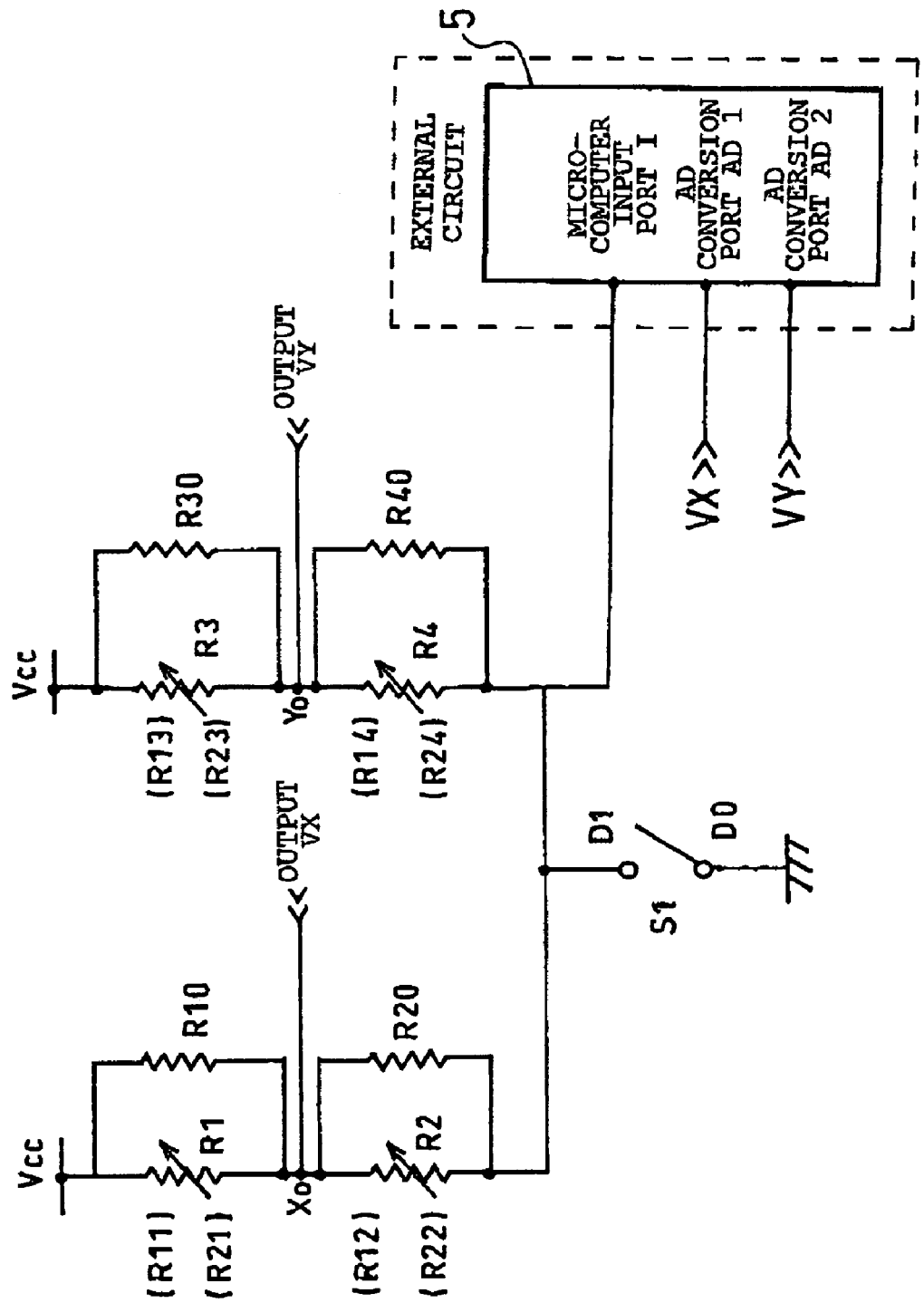
FIG. 4 is an example of the circuitry of the resistance type sensor shown in FIG. 1.
Figure 5:
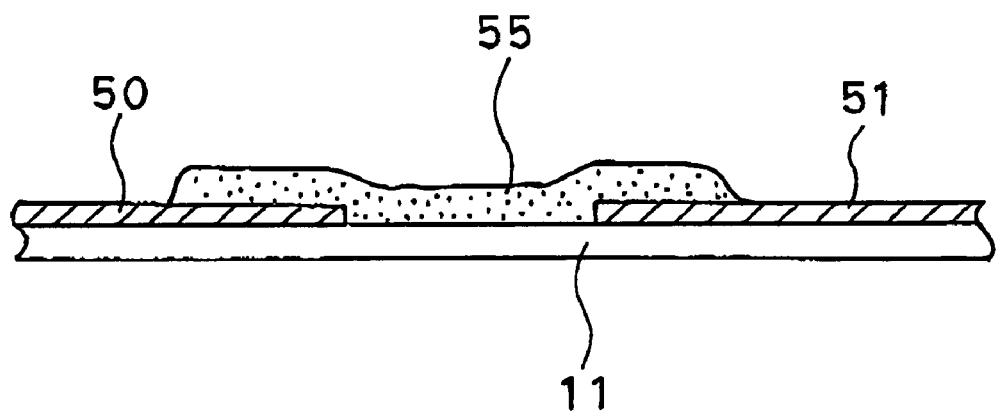
FIG. 5 is a view showing a schematic block diagram of a printed resistive element formed on FPC.
Figure 6:
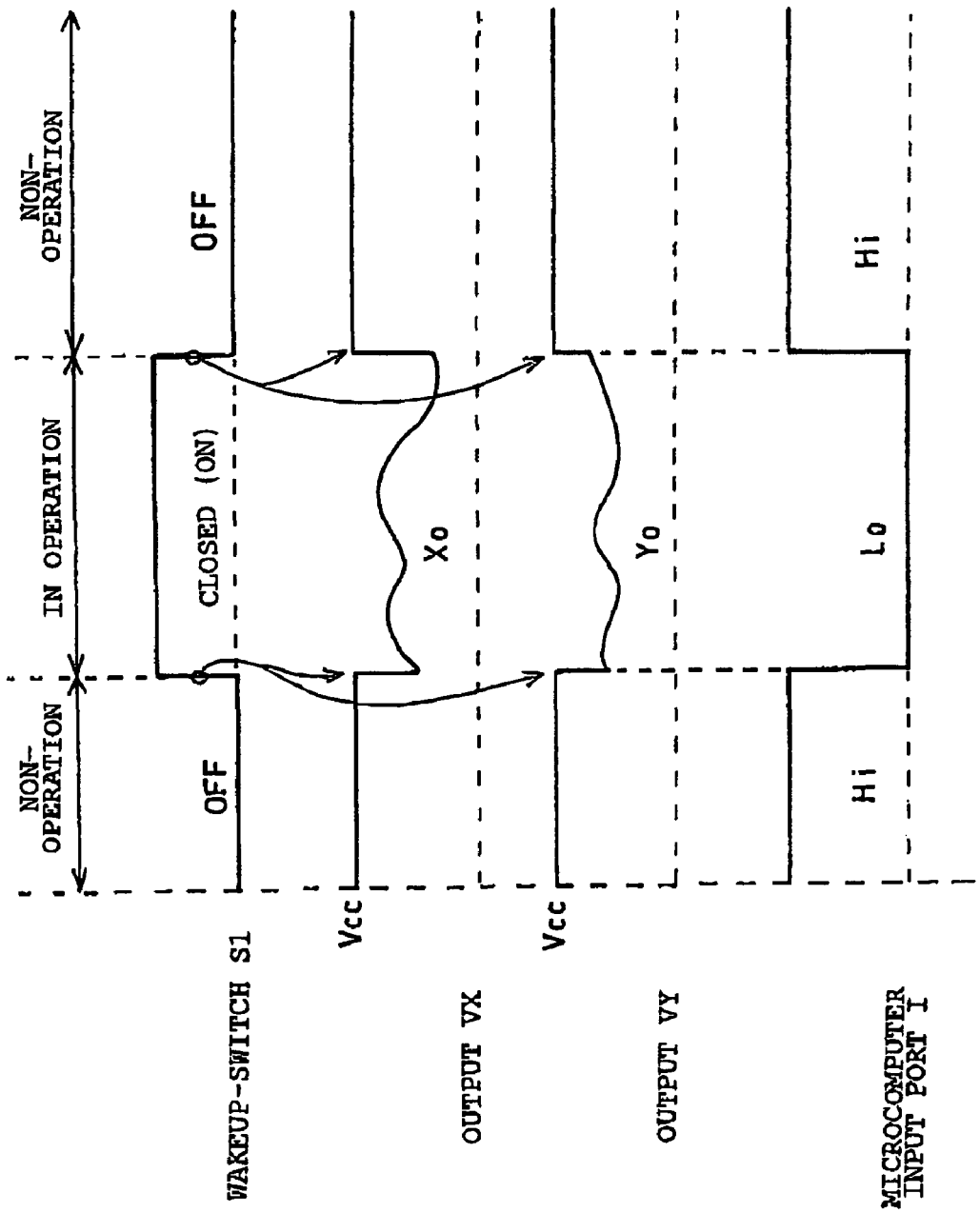
FIG. 6 is a view showing a relationship between a wakeup switch mode and an output.

Reference is now made to the circuitry of the resistance type sensor 1 with reference to FIGS. 3–6. FIG. 3 is a schematic diagram of a circuitry of the resistance type sensor shown in FIG. 1. FIG. 4 is an example of the circuitry of the resistance type sensor shown in FIG. 1. FIG. 5 is a view showing a schematic view of a printed resistive element formed on FPC, FIG. 6 is a view showing a relationship between a wakeup switch mode and an output.

In the resistance type sensor 1, the pressure-sensitive resistive inks R11–R14 and the pressure-sensitive resistive inks R21–R24 which are opposite to R11–R14 respectively form variable contact resistances R1–R4, respectively. As shown in FIG. 3, the signals output from the R/V conversion circuits connected to the variable contact resistances R1, R2 are read, for example, by an exclusive-OR gate or equivalent, to derive the output Vx. Similarly, the signals output from the R/V conversion circuits connected to the variable contact resistances R3, R4 are read, for example, by the exclusive-OR gate or equivalent, to derive the output Vy. With this construction, the outputs (analog voltages) for the X-axis direction and the Y-axis direction can be obtained on the basis of resistance values of the variable contact resistances R1–R4 that vary in accordance with direction and magnitude of a force applied to the operating button 31.

In the circuitry of the resistance type sensor shown in FIG. 4, one end of the variable contact resistance R1 and one end of the variable contact resistance R2 are connected with each other. The other end of the variable contact resistance R1 is held at the power-supply voltage Vcc, and the other end of the variable contact resistance R2 is connected to the displacement electrode D1. Similarly, one end of the variable contact resistance R3 and one end of the variable contact resistance R4 are connected with each other. The other end of the variable contact resistance R3 is held at the power-supply voltage Vcc, and the other end of the variable contact resistance R4 is connected to the displacement electrode D1. The displacement electrode D0 opposite to the displacement electrode D1 is connected to ground.

The one end of the variable contact resistance R1 and the other end of the same are connected to a fixed resistance R10. Similarly, one ends of the variable contact resistances R2, R3 and R4 and the other ends of the same are connected to fixed resistances R20, R30 and R40, respectively. The fixed resistances R10 to R40 are fixed resistances having a fixed resistance value that enable analog voltages for the X-axis direction and the Y-axis direction to be output even when a pair of pressure-sensitive resistive inks forming the variable contact resistances R1–R4 are isolated from each other and thereby the resistance values becomes infinite.

The fixed resistances R10 to R40 may be formed by commercially available chip resistors mounted on the FPC 11 or may be formed by printed resistive element (resistive layer) 55 formed between the conductive patterns 50, 51 of the FPC 11 in a screen printing, as shown in FIG. 5.

In the circuitry of FIG. 4, the output Vx from the node X0 between the variable contact resistance R1 and the variable contact resistance R2 and the output Vy from the node Y0 between the variable contact resistance R3 and the variable contact resistance R4 are derived from the following formula. The node X0 is also the node between the fixed resistance R10 and the fixed resistance R20, and the node Y0 is also the node between the fixed resistance R30 and the fixed resistance R40.

$$VX = \frac{\frac{R2 \cdot R20}{R2 + R20}}{\frac{R1 \cdot R10}{R1 + R10} + \frac{R2 \cdot R20}{R2 + R20}} \times Vcc \qquad \text{Formula 1}$$

$$VY = \frac{\frac{R4 \cdot R40}{R4 + R40}}{\frac{R3 \cdot R30}{R3 + R30} + \frac{R4 \cdot R40}{R4 + R40}} \times Vcc$$

The wakeup switch S1 is formed between the displacement electrode D0 and the displacement electrode D1. The wakeup switch S1 is constructed to select either the contact mode (on-state) of the displacement electrode D0 with the displacement electrode D1 or the non-contact mode (off-state) of the displacement electrode D0 with the displacement electrode D1.

When the operating button 31 is not operated, the displacement electrode D0 and the displacement electrode D1 are not in contact with each other and thus the wakeup switch S1 is in the off-state. In this state, the displacement electrode D1 (the conductive pattern (line) connected thereto) connected to the input port I of the microcomputer 5 is pulled up via the variable contact resistances R1 to R4 and the fixed resistances R10 to R40. Thus, when the wakeup switch S1 is in the off-state, almost no electric current flows through the variable contact resistances R1 to R4 and the fixed resistances R10 to R40, so that the outputs Vx, Vy of the resistance type sensor 1 have a close approximation to the value of the power-supply voltage Vcc. In this state, the input port I also has a close approximation to the value of the power-supply voltage Vcc, so that the input gets "Hi" digitally.

Vx=Vy=Vcc

On the other hand, when the operating button 31 is operated (or when the resistance values of the variable contact resistances R1 to R4 change), the displacement electrode D0 is put into contact with the displacement electrode D1 and thus the wakeup switch S1 is put into th on-state. At this time, the variable contact resistances R1 to R4 have resistance value corresponding to the operation of th operating button 31 (direction and magnitude of the force applied to the operating button 31), so that the electric current flows through the variable contact resistances R1 to R4 and the fixed resistances R10 to R40. As a result, the outputs Vx, Vy of the resistance type sensor 1 become outputs (analog voltages) corresponding to the operation. In this state, the input port I comes to have a value corresponding to the ground voltage, so that the input gets "Lo" digitally.

The AD conversion ports AD1, AD2 of the microcomputer 5 can detect the outputs Vx, Vy of the resistance type sensor 1 and can sense the operational state of the resistance type sensor 1 by monitoring the outputs Vx, Vy. By properly converting the signals output from the AD conversion ports AD1, AD2, for example a position of a cursor on a display of a personal computer can be controlled (See FIG. 6). It should be noted here that only when the input port I of the microcomputer 5 gets "Lo" digitally, the outputs Vx, Vy of the resistance type sensor 1, when operated, are converted into adequate format by the microcomputer 5 and then output.

When the operation of the operating button 31 is ended, the displacement electrode D0 and the displacement electrode D1 are returned to their original states, so that the wakeup switch S1 is returned to the off-state again. As described above, only when the operating button 31 is in operation (only when the wakeup switch S1 is in the on-state), the electric current flows through the sensor circuit, while on the other hand, only when the operating button 31 is not in operation (only when the wakeup switch S1 is in the off-state), almost n electric current flows through th sensor circuit.

The displacement electrode D1 is connected to the input port I of the microcomputer 5 so that the microcomputer 5 can judge on whether or not the resistance type sensor 1 is in an operated state to convert the outputs Vx, Vy that vary significantly depending on the operation state of the resistance type sensor 1 into signals with precision, for a precise control of the sensor. The displacement electrode D1 is not necessarily connected to the input port I of the microcomputer 5. The resistance type sensor 1 may be controlled by other proper methods.

As mentioned above, the resistance type sensor 1 can select either a force-detecting mode in which a force applied to the operating button 31 is detected (hereinafter it is referred to as "normal mode") or a power-saving mode in which power consumption is reduced as much as possible (hereinafter it is referred to as "sleep mode"). When the operating button 31 in the normal mode is not operated after passage of a specified time, the normal mode is automatically switched to the sleep mode. On the other hand, when the operating button 31 is operated in the sleep mode, the sleep mode is cancelled and switched to the normal mode automatically.

In the normal mode, the electric current flows through the variable contact resistances R1 to R4 and the fixed resistances R10 to R40, as mentioned above, so that the outputs Vx, Vy are output from the resistance type sensor 1. On the other hand, in the sleep mode, the electric current does not flow through the variable contact resistances R1 to R4 and the fixed resistances R10 to R40, so that the outputs Vx, Vy are not output from the resistance type sensor 1. Accordingly, in the mode (idle mode) in which the operating button 31 is not operated, wasteful power consumption is cut.

The microcomputer 5 includes a timer (not shown) for measuring elapsed time from the end of the last operation of the operating button 31 in the normal mode. The time (specified time) required for switching the normal mode to the sleep mode automatically when the operating button 31 is not operated in the normal mode is previously set.

Figure 7:
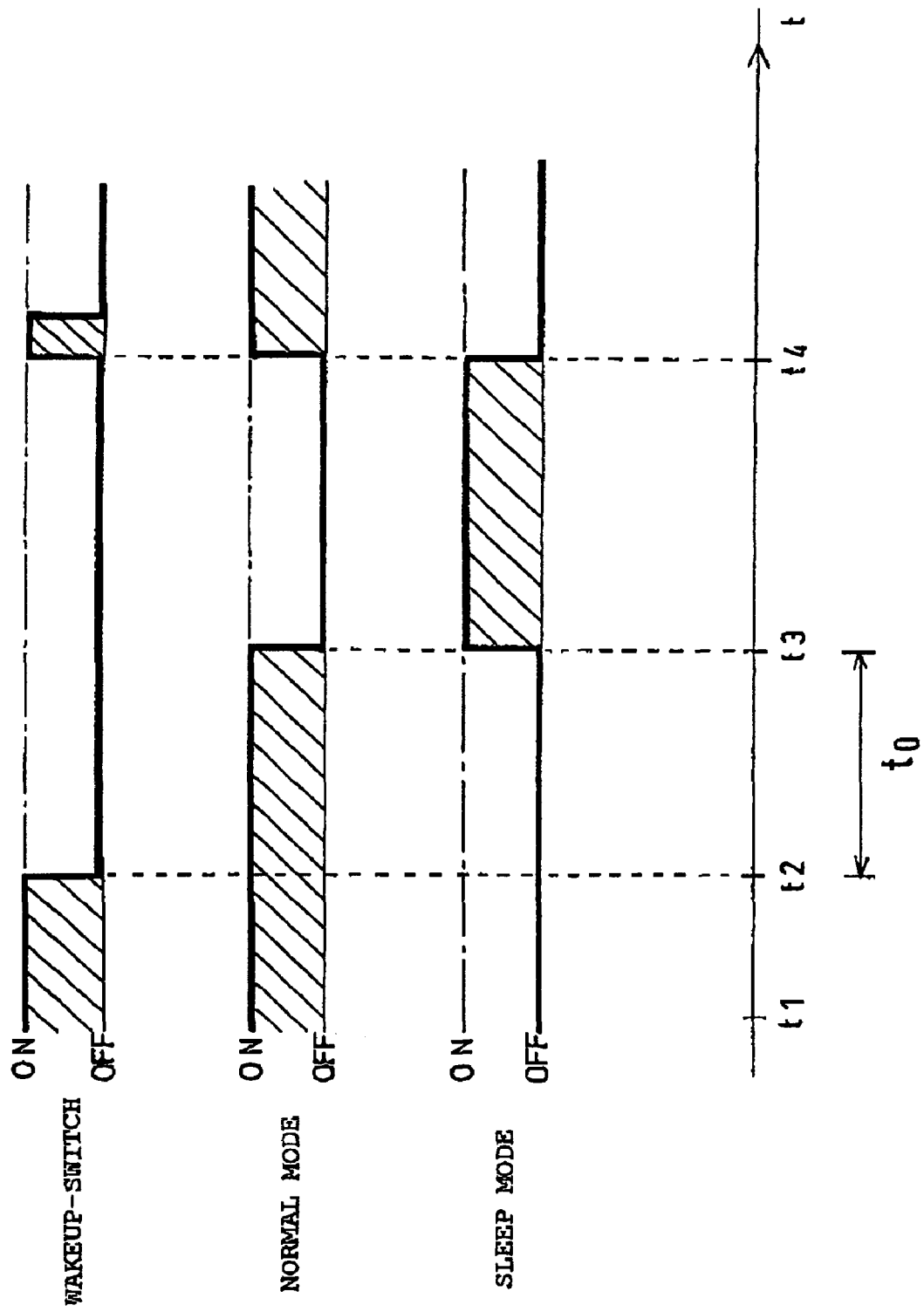
FIG. 7 is an illustration for explaining the mode selection of the resistance type sensor shown in FIG. 1.

Next, the mode selection of the resistance type sensor 1 is described with reference to FIG. 7. FIG. 7 is an illustration for explaining the mode selection of the resistance type sensor shown in FIG. 1. In FIG. 7, the states (on-state or off-state) of the normal mode, the sleep mode and the wakeup switch with respect to the time passage are illustrated in a correlative manner.

First, let us consider that the operating button 31 is already operated at the time t1 of FIG. 7. At this time at which the operating button 31 is already operated, the wakeup switch S1 is in the on-state and also the resistance type sensor 1 is in the normal mode (the normal mode is in the on-state and the sleep mode is in the off-state).

During the time period from t1 to t2 in FIG. 7, the operation of the operating button 31 is kept on. At the time t2 at which the operation of the operating button 31 is stopped, the wakeup switch S1 is switched from the on-state to the off-state. At substantially the same time as this, the operation of the timer of the microcomputer 5 starts.

During the time period from t2 at which the operation of the operating button 31 is stopped to t3, during which time passes by a specified time t0 only, the non-operation state of the operating button 31 is kept in th normal mode. In this embodiment, the resistance type sensor 1 is set so that it is automatically switched from the normal mode to the sleep mode when the non-operation state of the operating button 31 is kept in the normal mode by the specified time of t0 only.

Accordingly, when the time arrives at t3 in FIG. 7, the resistance type sensor 1 is switched from the normal mode to the sleep mode. In other words, the normal mode is switched from the on-state to the off-state and the sleep mode is switched from the off state to the on-state. Then, the sleep mode is kept in the on-state until the operating button 31 is re-operated.

Thereafter, when the operating button 31 is re-operated at the time t4 in FIG. 7, the wakeup switch S1 is switched from the off-state to the on-state and, at substantially the same time as this, the resistance type sensor 1 is switched from the sleep mode to the normal mode. In other words, the sleep mode is switched from the on-state to the off-state and also the normal mode is switched from the off-state to the on-state.

When the wakeup switch S1 is switched from the off-state to the on-state, the voltage of the displacement electrode D1 (voltage of the input port I of the microcomputer 5) surely varies across the threshold voltage half of the power-supply voltage. Therefore, the operation of the operating button 31 can be surely detected by simply monitoring the changes of voltage of the input port I connected to the displacement electrode D1.

The timer of the microcomputer 5 is stopped and reset at the time when the operating button 31 is operated again. Then, when the restarted operation of the operating button 31 is stopped at the time t4 in FIG. 7, the operation of the timer is started.

Figure 8:
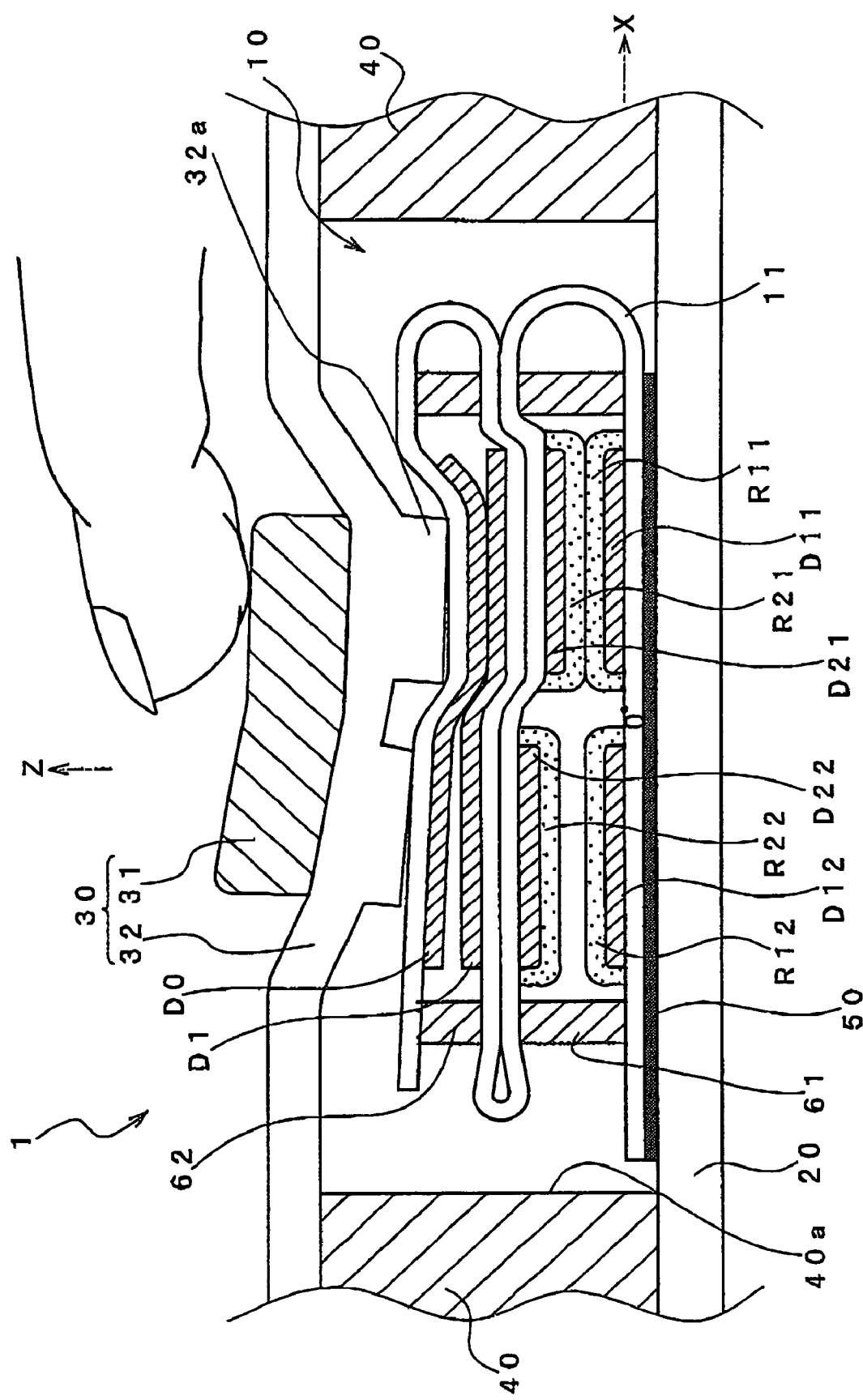
FIG. 8 is a schematic cross-sectional view of the resistance type sensor shown in FIG. 1 when an operating button is operated in an X-axis positive direction.

Next, operation of the thus constructed resistance type sensor 1 according to this embodiment will be described with reference to the drawing. FIG. 8 is a schematic cross-sectional view of the resistance type sensor shown in FIG. 1 when the operating button is operated in an X-axis positive direction.

Let us consider the case where the operating button 31 is operated in the X-axis positive direction in the state in which no force is applied to the operating button 31 shown in FIG. 1, as shown in FIG. 8, in other words, the case where a force to press down the operating button 31 toward the fixing plate 20 (a force acting in the Z-axis negative direction) is applied to the operating button 31 from the arrow for the X-axis positive direction formed on the upper surface of the operating button 31.

By pressing down a portion of the operating button 31 corresponding to the X-axis positive direction, the operating button 31 and the keypad base 32 are elastically deformed and, as a result, the portion of the operating button 31 corresponding to the X-axis positive direction is displaced downwardly. Then, a portion of the protrusion 32a formed on the lower surface of the keypad base 32 corresponding to the X-axis positive direction is displaced similarly to the operating button 31, and brought into contact with a back side of the fourth surface of the FPC 11.

Sequentially, when the portion of the operating button 31 corresponding to the X-axis positive direction is pressed down further, th fourth surface of the FPC 11 is elastically deformed and, as a result, a portion of the displacement electrode D0 corresponding to the X-axis positive direction is displaced downward. Then, when the related portion of the displacement electrode D0 is pressed down to an extent corresponding to a specified height, the displacement electrode D0 at its end portion with respect to the X-axis positive direction is brought into contact with the displacement electrode D1. As a result of this, the wakeup switch S1 is switched from the off-state to the on state. At this time, since the displacement electrode D0 is connected to ground, the displacement electrode D1 contacted with the displacement electrode D0 is also connected to ground.

Thereafter, when the operating button 31 is pressed down further, the operating button 31, the keypad base 32 and the second surface to the fourth surface of the FPC 11 are elastically deformed, while the wakeup switch S1 is kept in the on-state, and the pressure-sensitive resistive ink R21 (conductive land D21) is displaced downwardly. Then, the interval between the pressure-sensitive resistive ink R21 and the pressure-sensitive resistive ink R11 is gradually narrowed, so that the both pressure-sensitive resistive inks are finally contacted with each other and, then, the resistance values of the pressure-sensitive resistive ink R21 and the pressure-sensitive resistive ink R11 vary.

Although there may be cases that in addition to the pressure-sensitive resistive inks R21 and R11 arranged to correspond to the X-axis positive direction, the pressure-sensitive resistive inks R22–R24 and R12–R14 arranged to correspond to the X-axis negative direction, the Y-axis positive direction and th Y-axis negative direction, respectively, are contacted, it is the pressure-sensitive resistive inks R21 and R11 arranged to correspond to the X-axis positive direction of the operating direction that are contacted most tightly whereas it is the pressure-sensitive resistive inks R22 and R12 arranged to correspond to the X-axis negative direction of the opposite direction to the operating direction that are contacted most loosely.

In general, the resistance values of the variable contact resistances R1–R4 vary inversely as the pressure between the pressure-sensitive resistive inks R21–R24 and R11–R14 of each pair forming the variable contact resistances. Accordingly, as the pressure between the pressure-sensitive resistive inks of each pair increases, the resistance values of the variable contact resistance R1–R4 decreases. This means that the pressure-sensitive resistive inks corresponding to the operating direction of the operating button 31 vary most in the resistance value of the variable contact resistance R1–R4 to thereby produce a decreased resistance value whereas those corresponding to the opposite direction to the operating direction vary least in the resistance value to thereby produce an increased resistance value.

Thus, when a force is applied to the portion of the operating button 31 corresponding to the X-axis positive direction, the output Vx from the resistance type sensor 1 is derived by reading the changes of the resistance values of the variable contact resistances R1, R2.

When the force applied to the operating button 31 is removed, the displacement electrodes D0, D1 are returned to their original positions by the elasticity of the FPC 11, so that the both are isolated from each other and the wakeup switch S1 is switched to the off-state. At this time, the pressure-sensitive inks R11–R14 and R21–R24 are also returned to their original positions, so that the pressure-sensitive inks of each pair are isolated from each other and the resistance values of the variable contact resistances are returned to their original values (their original large values).

In this embodiment, since the displacement electrode D0 which is an electrode layer positioned closest to the operating button 31 and susceptible to external influences is always connected to ground, it can expectably shield the sensor against external influences, to be less subject to noises and the like from outside.

The resistance type sensor 1 of this embodiment is intended for use as a force sensor and is preferably used as an input device (joystick) of a mobile phone, a personal digital assistant (PDA), a personal computer, a game, a remote-control device and the like. It is particularly useful for a battery-operated input device. The resistance type sensor 1 of this embodiment may be used as other sensors, such as an acceleration sensor, than the force sensor. In this case also, the same effect can be provided.

As seen from the foregoing, the resistance type sensor 1 of this embodiment can be used as a device having the function of outputting magnitude of a force applied to the operating button 31 from outside in the form of signal (analog signal) and also has the function as the wakeup switch S1 for detecting the operation applied to the operating button 31 to change the resistance values of the variable contact resistances R1–R4. Thus, this resistance type sensor has the function as a composite device useable as either of the former device and the latter device, so that the need to re-create the sensor for either of the purposes mentioned above is eliminated.

Also, when operation is applied to the operating button 31 (when resistance values of the variable contact resistances R1–R4 vary), the displacement electrode D0 is displaced increasingly with displacement of the operating button 31 and is brought into contact with the displacement electrode D1 reliably, first. Then, the pressure-sensitive resistive inks R21–R24 are displaced while the displacement electrode D0 and the displacement electrode D1 are kept in their contacted state. It should be noted here that the output from the displacement electrode D1 of the resistance type sensor 1 in the contacted state of the displacement electrodes D0 and D1 or in the non-contacted state of the same is either of signal at a high level near a power-supply voltage at which the displacement electrode D1 is kept and signal at a low level near a ground potential. Due to this, for example when the both displacement electrodes are switched from their non-contacted state to their contacted state, the output from the displacement electrode D1 surely varies across a threshold voltage. Thus, the operation applied to the resistance type sensor 1 can be reliably detected by monitoring the output from the displacement electrode D1 of the resistance type sensor 1 and thus the sleep mode can be reliably cancelled. This can provide the result that in the resistance type sensor 1 as well, when the operating button 31 is not operated for many hours, the power consumption can be cut by switching th resistance type sensor 1 to the sleep mode.

The resistance type sensor 1 is produced in the process that after the pressure-sensitive resistive inks R11–R14 and R21–R24 laid over the conductive lands D11–D14 and D21–D24, and the displacement electrodes D0 and D1 are formed on the surface of the single FPC 11 having flexibility, the FPC 11 is folded in such a manner that the pressure-sensitive resistive inks of each pair and the displacement electrodes of each pair are opposite to each other. This can produce advantageous effects of providing a simplified production process of the sensor and reduced production costs.

Also, since the variable contact resistances R1–R4 and the wakeup switch S1 are arranged in two layers with respect to the vertical direction, an area required for the resistance type sensor 1 to be produced can be reduced comparatively. This enables the resistance type sensor 1 to be reduced in size.

Also, since the wakeup switch S1 is disposed to be closer to the operating button 31 than the variable contact resistances R1–R4, the switching of the state of the wakeup switch S1 can be made with ease before the resistance values of the variable contact resistances R1–R4 vary, and as such can allow the wakeup switch S1 to be given priority use.

Figure 9:
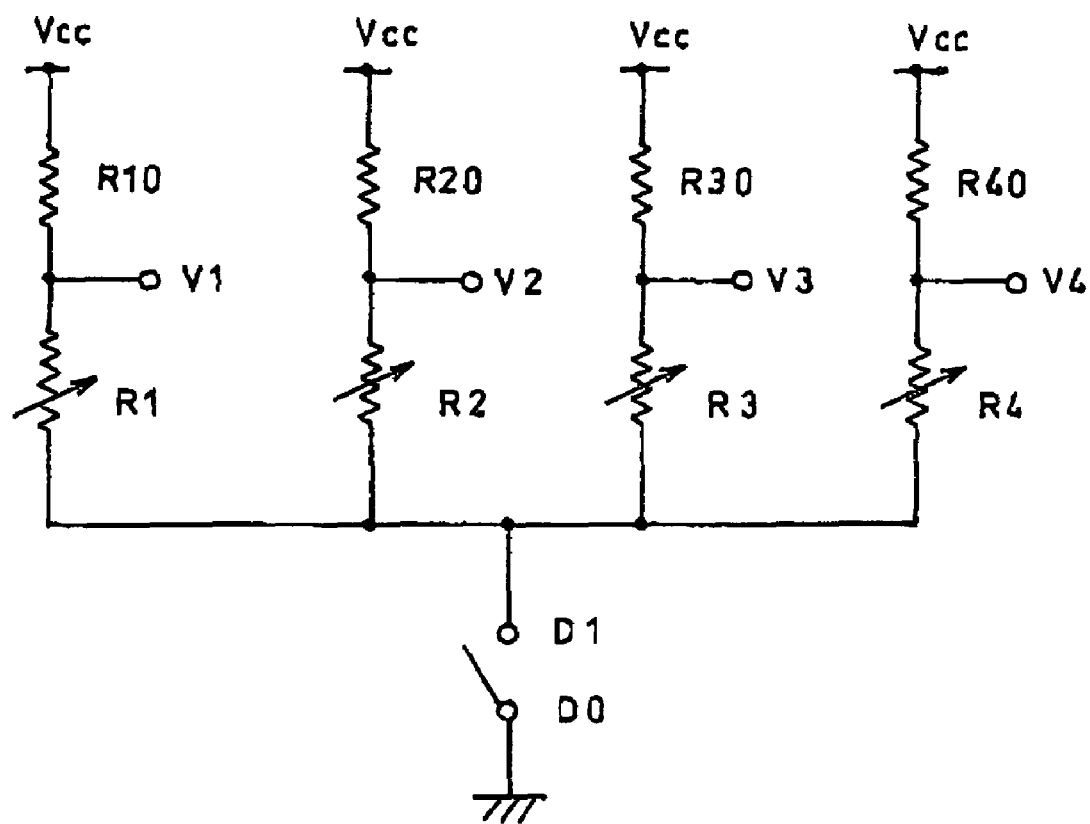
FIG. 9 is another example of the circuitry of the resistance type sensor according to a variant of the present invention.

Next, the construction of the resistance type sensor according to a variant of the first embodiment of the present invention will be described with reference to the drawing. FIG. 9 is another example of the circuitry of the resistance type sensor according to the variant of the present invention.

The resistance type sensor according to th variant differs in the circuitry of the sensor circuit from the resistance type sensor of the first embodiment. As the remaining constructions are the same as those of the resistance type sensor 1 of FIG. 1, the description thereon will be omitted, with like numerals given to like parts.

In the circuit of the resistance type sensor according to this variant, one ends of the fixed resistances R10–R40 are held at the power-supply voltages Vcc and the other ends thereof are respectively connected with one ends of the variable contact resistances R1–R4. The other ends of the variable contact resistances R1–R4 are connected to the displacement electrode D1. The output V1–V4 from the node between the fixed resistance R10–R40 and the variable contact resistance R1–R4 of each pair can be obtained.

In the circuitry of FIG. 9, the outputs Vx, Vy are derived from the following formulas using arithmetical operation of the microcomputer 5:

$$Vx=k1(V1-V2)$$

$$Vy=k2(V3-V4)$$

where k1 and k2 are coefficients.

Thus, the circuitry of the resistance type sensor 1 can arbitrarily be modified in accordance with an intended use of the sensor.

Figure 10:
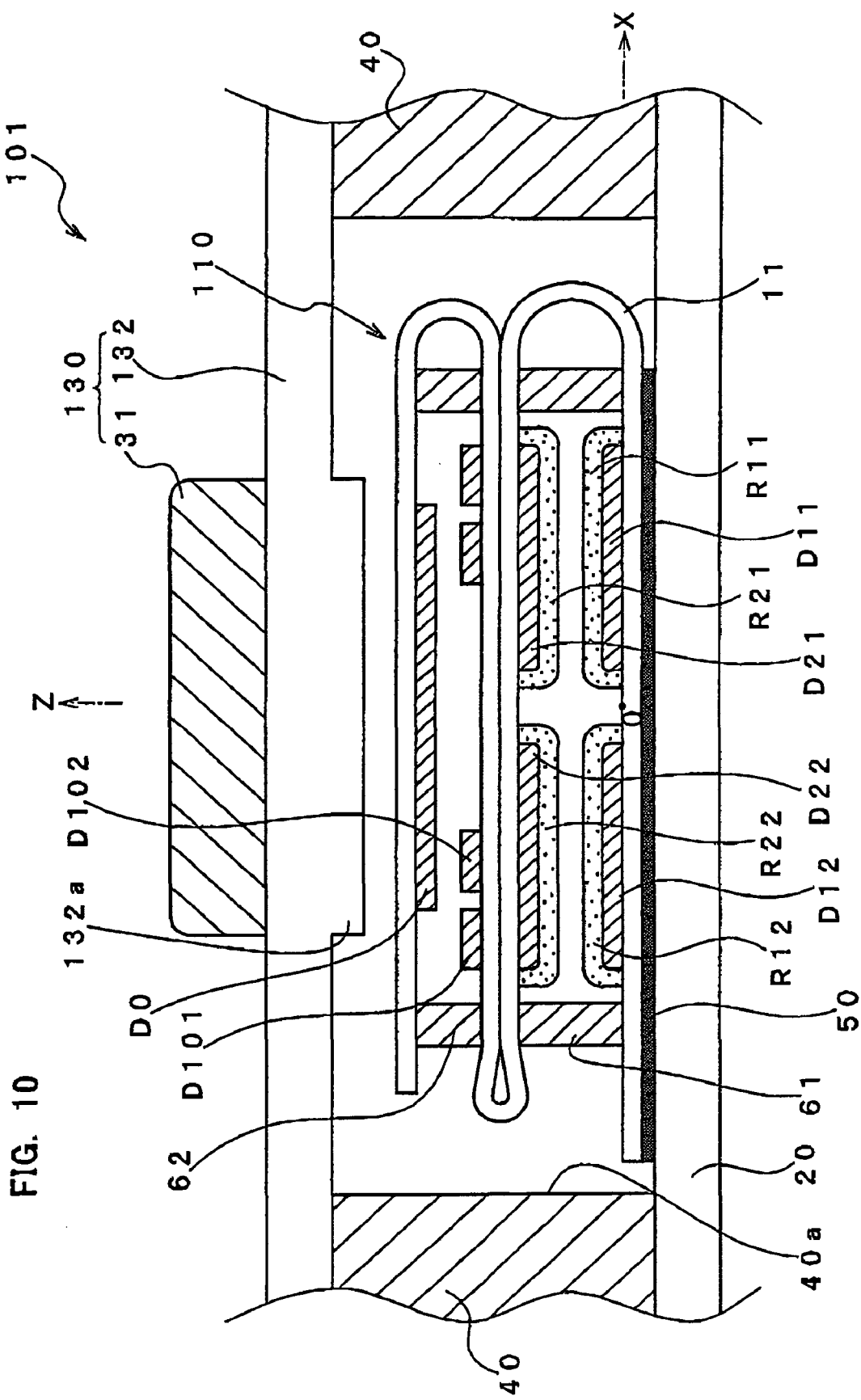
FIG. 10 is a schematic sectional view of a resistance type sensor according to the second embodiment of the present invention.
Figure 11:
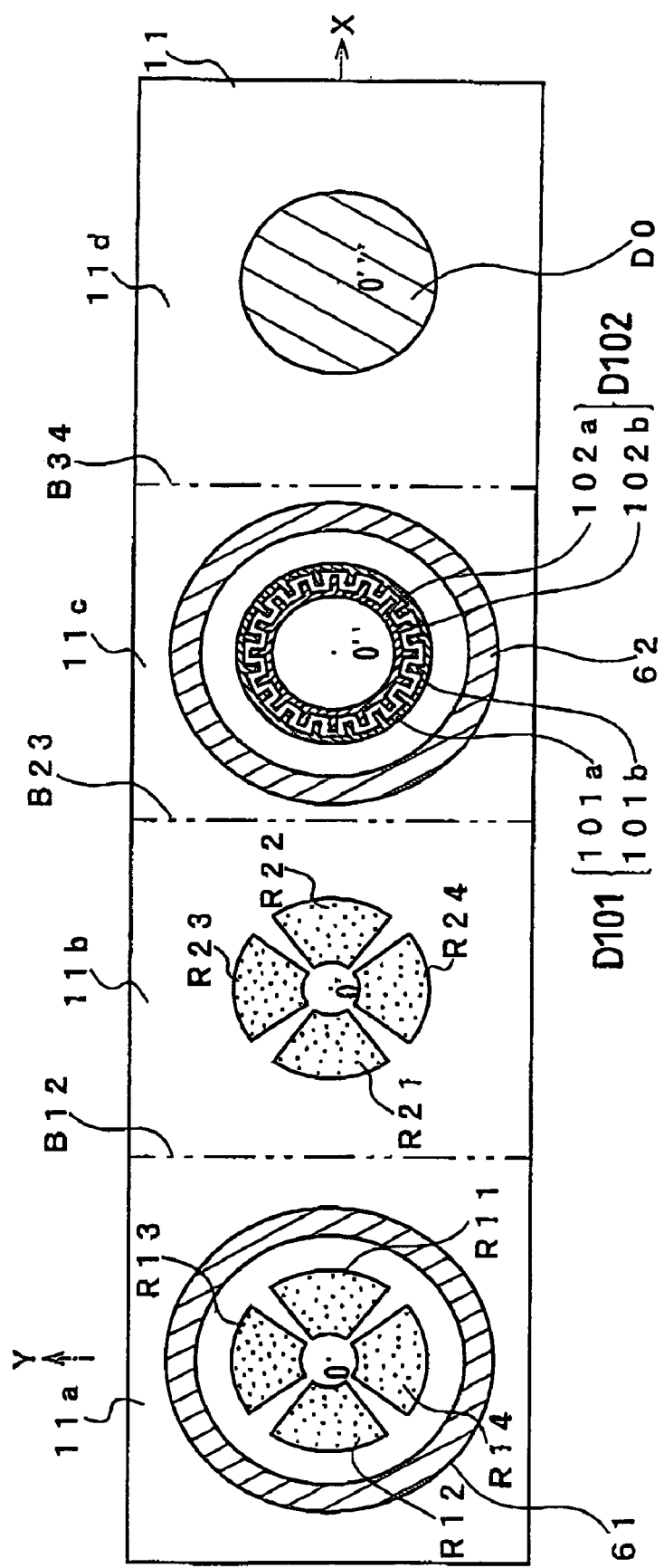
FIG. 11 is a view of an arrangement of a plurality of electrodes and spacers included in the resistance type sensor of FIG. 10.
Figure 12:
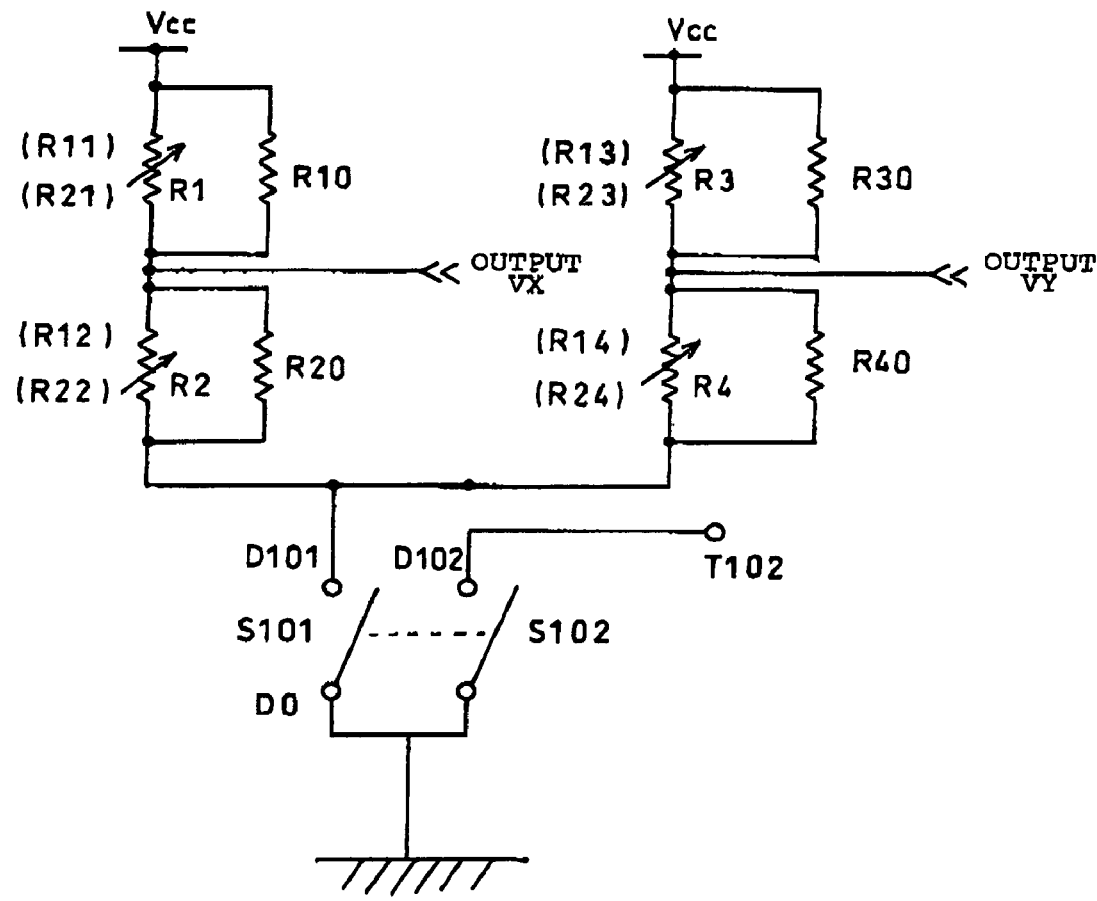
FIG. 12 is an example of the circuitry of the resistance type sensor shown in FIG. 10.

Next, the second embodiment of the present invention will be described with reference to FIGS. 10–12. FIG. 10 is a schematic sectional view of a resistance type sensor according to the second embodiment of the present invention. FIG. 11 is a view of an arrangement of a plurality of electrodes and spacers included in the resistance type sensor of FIG. 10. FIG. 12 is an example of the circuitry of the resistance type sensor shown in FIG. 10.

Now, the detailed structure of a resistance type sensor 101 according to the second embodiment will be described with reference to FIGS. 10 and 11. The resistance type sensor 101 of FIG. 10 differs from the resistance type sensor 1 of FIG. 1 in the construction of an operating portion 130 and the construction of displacement electrodes D101, D102 formed on the third surface 11c of the FPC 11. As the remaining constructions are the same as those of the resistance type sensor 1 of FIG. 1, the description thereon will be omitted, with like numerals given to like parts.

The operating portion 130 includes the operating button 31 and a keypad base 182 for supporting the operating button 131. The keypad base 132 has a circular protrusion 132a formed on a lower surface thereof at a position corresponding to the operating button 31 adhesive bonded to an upper surface of the keypad base. The protrusion 132a has an outer diameter substantially equal to an outer diameter of the operating button 31.

The displacement electrodes D101, D102 are formed on the third surface 11c of the FPC 11. As shown in FIG. 11, the displacement electrode D102 is formed in a generally annular form with center at the point O", and the displacement electrode D101 is formed in a generally annular form around the outside of the displacement electrode D102. The displacement electrode D101 has a circumference portion 101a and a plurality of protrusions 101b protruding inwardly from the circumference portion 101a. Th displacement lectrode D102 has a circumference portion 102a and a plurality of protrusions 102b protruding inwardly from the circumference portion 102a.

The circumference portion 101a and the circumference portion 102a each have the same width along the circumference. Also, the protrusions 101b and 102b each have substantially the same width as the width of the circumferences 101a and 102a and each have a generally rectangular form having a length shorter than an interval at which the circumference portion 101a and the circumference portion 102a are spaced from each other. The protrusions 101b and the protrusions 102b are arrayed alternately along the circumference. The displacement electrode D101 has an inner periphery formed in a pectinated form, and the displacement electrode D102 has an outer periphery formed in a pectinated form. The protrusions 101b and 102b may be modified in number and shape arbitrarily. Preferably, the both protrusions are arrayed leaving little space therebetween to an extent possible to which the both are not contacted with each other.

As is the case with the first embodiment, the FPC 11 is folded along the boundary lines B12, B23, B34 between adjacent surfaces, to complete the sensor unit 110 as shown in FIG. 10. This produces the resistance type sensor 101 in which four variable contact resistances R1–R4 corresponding to the X-axis positive direction, the X-axis negative direction, the Y-axis positive direction and the Y-axis negative direction and a common wakeup switch S101 commonly used for the four directions mentioned above are formed by the pressure-sensitive resistive inks R11–R14 and R21–R24, and the displacement electrodes D0, D101, D102 (See FIG. 12).

In the sensor circuit of this embodiment, one end of the variable contact resistance R2 on the side opp site to the variable contact resistance R1 and one end of the variable contact resistance R4 on the side opposite to the variable contact resistance R3 are connected to the displacement electrode D101, as shown in FIG. 12. Thus, the wakeup switches S101, S102 are formed between the displacement electrodes D101, D102 and the displacement electrode D0 opposite thereto. The displacement electrode D102 is connected with a terminal T102 so that a switch S102 can be used for another control by detecting ON/OFF of the switch S102 through the terminal T102.

When the operating button 31 is operated in the X-axis positive direction, the portion of the operating button 31 corresponding to the X-axis positive direction is pressed down and thereby the portion of the displacement electrode D0 corresponding to the X-axis positive direction is also displaced downwardly. Then, when the related portion of the displacement electrode D0 is pressed down to an extent corresponding to a specified height, the related portion of the displacement electrode D0 and the displacement electrodes D101, D102 are brought into contact with each other substantially simultaneously. As a result of this, the wakeup switches S101, S102 are switched from the off-state to the on-state. This means that when no operation is applied to the operating button 31, the wakeup switches S101, S102 are both in the off-state, while on the other hand, when operation is applied to the operating button 31 (when resistance values of the variable contact resistances R1–R4 vary), they are both put into the on-stat. Therefore, the switch S101 is applicable to the use of ON/OFF of the resistance type sensor 101, while the switch S102 is applicable to some kind or another control (See FIG. 12).

As mentioned above, in the resistance type sensor 101 according to this embodiment, since the two displacement electrodes D101, D102 held at the power-supply voltage Vcc are arranged in such a relation as to be opposite to the grounded displacement electrode D0, two switch circuits can be formed by providing wiring to each of the displacement electrodes D101, D102. This can provide a widened available range of the resistance type sensor 101.

Figure 13:
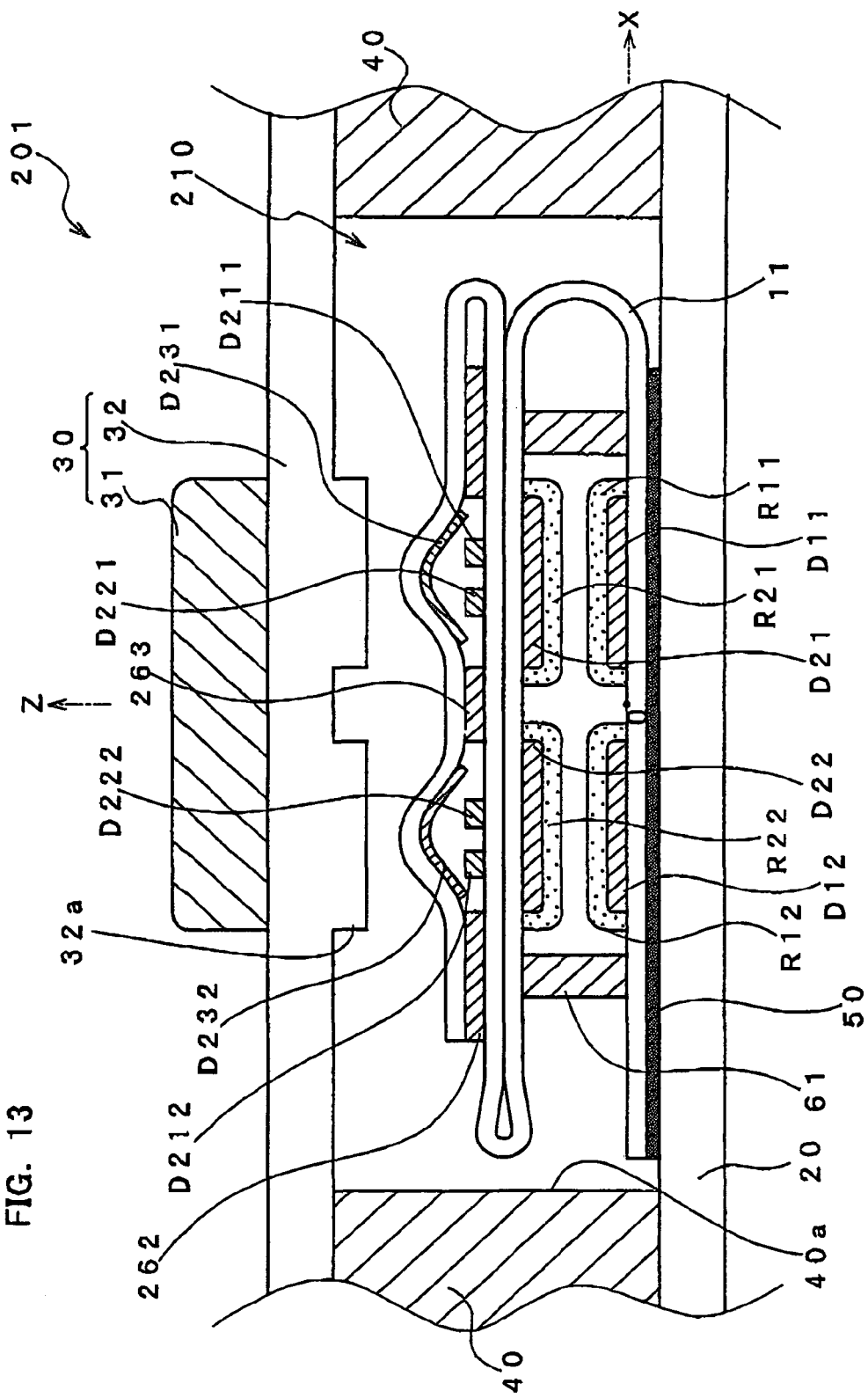
FIG. 13 is a schematic sectional view of a resistance type sensor according to the third embodiment of the present invention.
Figure 14:
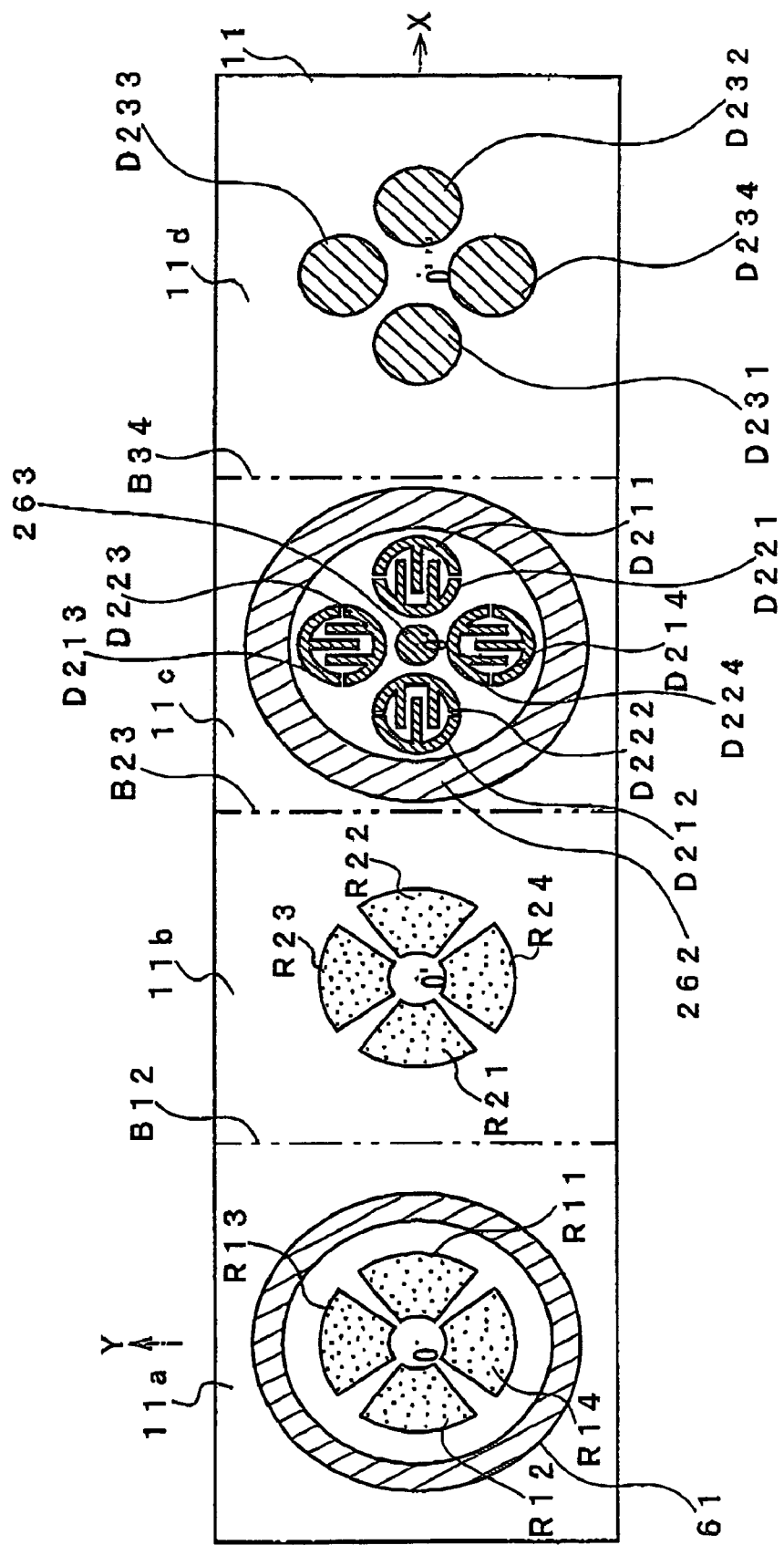
FIG. 14 is a view of an arrangement of a plurality of electrodes and spacers included in the resistance type sensor of FIG. 13.
Figure 15:
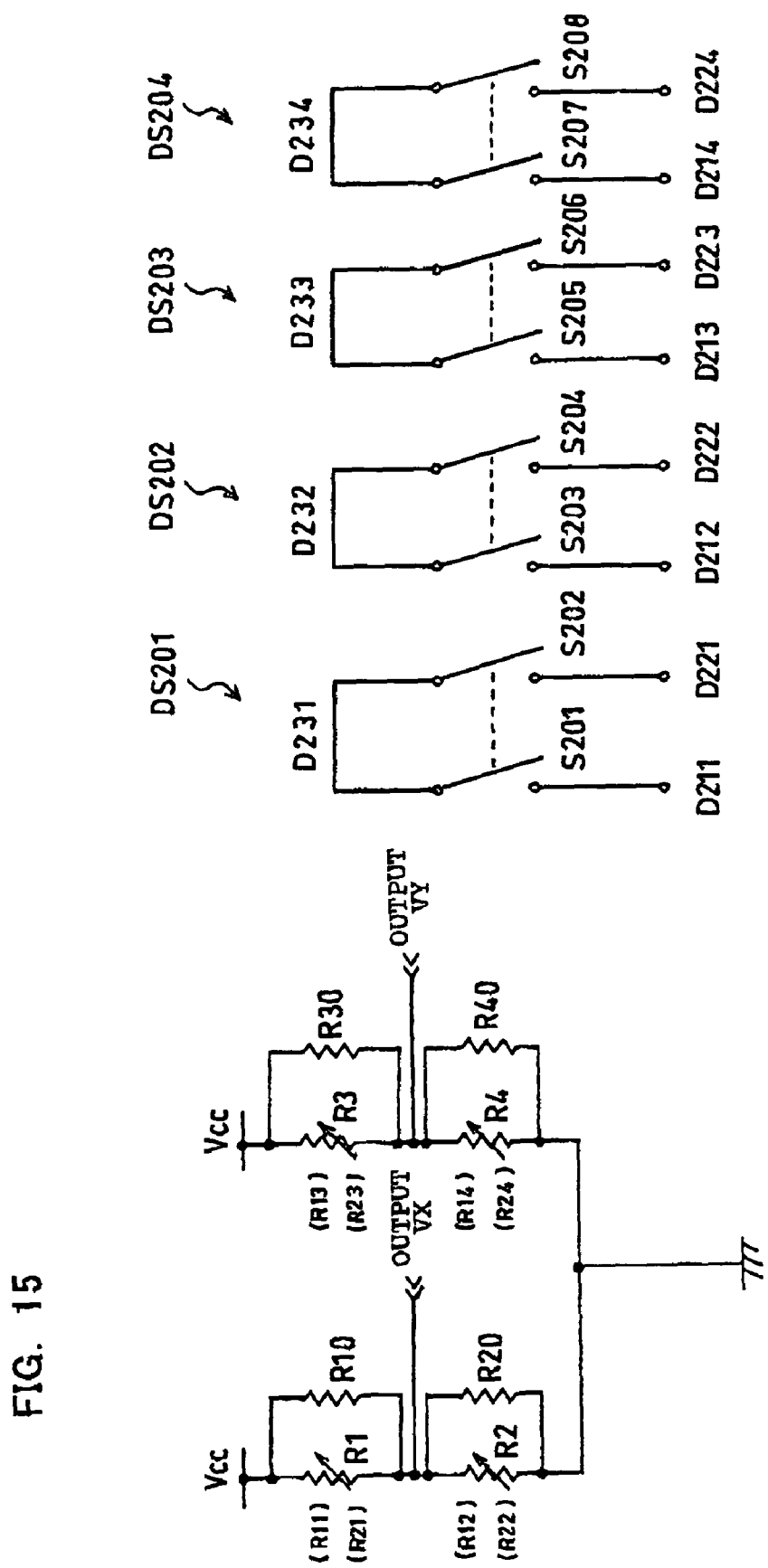
FIG. 15 is an example of the try of the resistance type sensor shown in FIG. 13.

Next, the third embodiment of the present invention will be described with reference to FIGS. 13 to 15. FIG. 13 is a schematic sectional view of a resistance type sensor according to the third embodiment of the present invention. FIG. 14 is a view of an arrangement of a plurality of electrodes and spacers included in the resistance type sensor of FIG. 13. FIG. 15 is an example of the circuitry of the resistance type sensor shown in FIG. 13.

Now, the detailed structure of the resistance type sensor 201 according to the third embodiment will be described with reference to FIGS. 13 and 14. The resistance type sensor 201 of FIG. 13 differs from the resistance type sensor 1 of FIG. 1 in that whereas the resistance type sensor 1 is provided with a wakeup switch S1, the resistance type sensor 201 is provided with mere switches S201–S208. As the remaining constructions are the same as those of the resistance type sensor 1 of FIG. 1, the description thereon will be omitted, with like numerals given to like parts.

In the resistance type sensor 201, contact electrodes D211–D214 and D221–D224 and displacement electrodes D231–D234 are formed on the third surface 11c and the forth surface 11d of the FPC 11, respectively, in the screen printing using the conductive ink containing silver or carbon as raw material.

The contact electrodes D211–D214 and D-221–D224 are grouped in pairs and are arrayed adjacently so that the contact electrodes of each pair are opposite to each other. Then, a pair of contact electrodes D211 and D221, a pair of contact electrodes D212 and D222, a pair of contact electrodes D213 and D223 and a pair of contact electrodes D214 and D224 are arranged to correspond to the X-axis positive direction, the X-axis negative direction, the Y-axis positive direction and the Y-axis negative direction, respectively.

To take an example of configuration of the contact electrodes, the pair of contact electrodes D211 and D221 each have a periphery of a semi-circular arch and a protrusion protruding from the periphery toward an adjacent counterpart. The peripheries of the contact electrodes D211, D221 each have the same width along the semi circular arch. Also, the protrusions each have substantially the same width as the width of the peripheries and each have a generally rectangular form having a length shorter than an interval at which the peripheries are spaced from each other. The protrusions of the contact electrodes D211, D221 are arrayed alternately. Each contact electrode D211, D221 is formed in a pectinated form at a portion thereof opposite to the counterpart. The protrusions of the contact electrodes D211, D221 may be modified in number and shape arbitrarily. Preferably, th both protrusions are arrayed leaving little space therebetween to an extent possible to which the both are not contacted with each other, As the same thing applies to the remaining pairs of contact electrodes D211 and D222, D213 and D223, and D214 and D224, the description thereon is omitted.

The displacement electrodes D231–D234 are arrayed so that when the FPC 11 is folded to complete the sensor unit 10 (FIG. 13), they are opposite to the pair of contact electrodes D211 and D221, the pair of contact electrodes D212 and D222, the pair of contact electrodes D213 and D223 and the pair of contact electrodes D214 and D224, respectively. In FIG. 14, the displacement electrode D231 is arranged to correspond to the X-axis negative direction and the displacement electrode D232 is arranged to correspond to the X-axis positive direction.

The displacement electrodes D231–234 each have a circular form and have a diameter larger than a diameter of the opposite contact electrodes D211–214 and D221–224. Also, the displacement electrodes D231–234 are formed in a domed form by pressing the FPC 11. These domed displacement electrodes D231–D234 can cover the opposite contact electrodes D211–D214 and D221–D224 with spaced apart thereform.

An annular spacer 262 is disposed around the outside of the contact electrodes D211–D214 and D221–D224 is disposed on the third surface 11c and a circular spacer 263 is disposed at an inside thereof.

As is the case with the first embodiment, the FPC 11 is folded along the boundary lines B12, B23, B34 between adjacent surfaces, to complete the sensor unit 210 as shown in FIG. 13. This produces the resistance type sensor 201 in which four domed switches DS201–DS204 (FIG. 15) corresponding to th X-axis positive direction, the X-axis negative direction, the Y-axis positive direction and the Y-axis negative direction, respectively are formed by the displacement electrodes D231–D234 and the contact electrodes D211–D214 and D221–D224.

The displacement electrodes D231–D234 are domed for the purpose of giving a light tactile feel to an operator when the operator operates the four domed switch DS201–DS204 to switch them from the off-state to the on-state. Accordingly, when such a tactile feel is not wanted, the displacement electrodes D231–D234 need not necessarily be formed in the domed form. The form of the displacement electrodes may be modified arbitrarily, as long as they are configured to be spaced from the contact electrodes D211–D214 and D221–D224 when no operation is applied to the operating button 31.

Although the displacement electrodes D231–D234 are shaped through the use of the FPC 11 in this embodiment, modification may be made to this by replacing the displacement electrodes D231–D234 with a metal dome and also replacing the contact electrodes D211–D214 and D221–D224 with circular or annular electrodes corresponding to the displacement electrodes D231–D234.

In the sensor circuit of this embodiment, one end of the variable contact resistance R2 on the side opposite to the variable contact resistance R1 and one end of the variable contact resistance R4 on the side opposite to the variable contact resistance R3 are always connected to ground, as shown in FIG. 15. Thus, electric current always flows through the variable contact resistances R1–R4 and the fixed resistances R10–R40.

The four domed switch s DS201–DS204 mentioned above are provided separately from the variable contact resistances R1–R4. It is noted here that the domed switch DS201 includes switches S201 and S202. Similarly, the domed switch DS202 includes switches S203 and S204, the domed switch DS203 includes switches S205 and S206, and the domed switch DS204 includes switches S207 and S208.

In the resistance type sensor 201, when the operating button 31 is operated in the X-axis positive direction, the portion of the operating button 31 corresponding to the X-axis positive direction is pressed down and thereby the portion of the displacement electrode D231 is also displaced downwardly. Then, when the displacement electrode D231 is pressed down to an extent corresponding to a specified height, an outer edge portion of the displacement electrode D231 is brought into contact with the third surface of the FPC11. At this time, the displacement electrode D231 covers the opposite contact electrodes D211 and D221, with spaced apart therefrom.

When the portion of the operating button 31 corresponding to the X-axis positive direction is pressed down further, a downward force is applied to the top of the displacement electrode D231. When the force does not reach a specified value, the displacement electrode D231 is not displaced virtually. On the other hand, when the force reaches the specified value, the displacement electrode D231 is elastically deformed and depressed drastically with buckling at a nearly top portion thereof and is brought into contact with the contact electrodes D211, D221. This brings the domed switch DS201 (switches S201, S202) into the ON-state. At this time, the operator is given a clear tactile fe l. Thereafter, the portion of the operating button 31 corresponding to the X-axis positive direction is pressed down continuously, the pressure-sensitive resistive ink R21 (the conductive land D21) is displaced downwardly while the domed switch DS201 is kept in the ON-state. Then, the interval between the pressure-sensitive resistive ink R21 and the pressure-sensitive resistive ink R11 decreases gradually. Finally, the pressure-sensitive resistive ink R21 and the pressure-sensitive resistive ink R11 are put in contact with each other, so that resistance values of the pressure-sensitive resistive ink R21 and the pressure-sensitive resistive ink R11 vary.

As seen from the foregoing, the resistance type sensor 201 according to this embodiment can be used as a device having the function of outputting magnitude of a force applied to the operating button 31 from outside in the form of signal (analog signal) and also has the mere switch function of switching between the on-state and the off-state, fully independently of changes of resistance values of the variable contact resistances R1–R4 corresponding to the direction of the force applied. Thus, this resistance type sensor 201 has the function as a composite device useable as either of the former device and the latter device, so that the need to re-create the sensor for either of the purposes mentioned above is eliminated.

Figure 16:
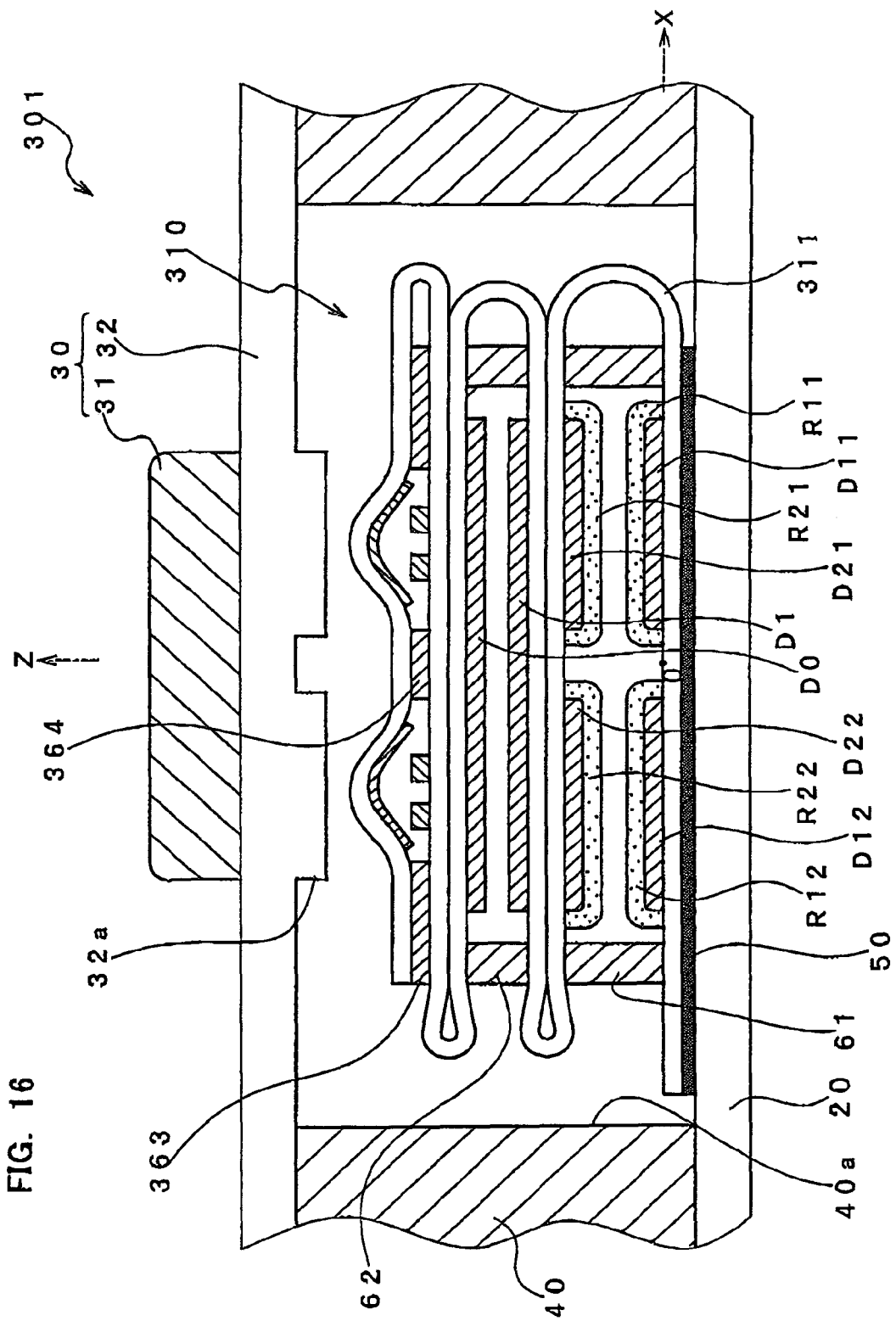
FIG. 16 is a schematic sectional view of a resistance type sensor according to the fourth embodiment of the present invention.
Figure 17:
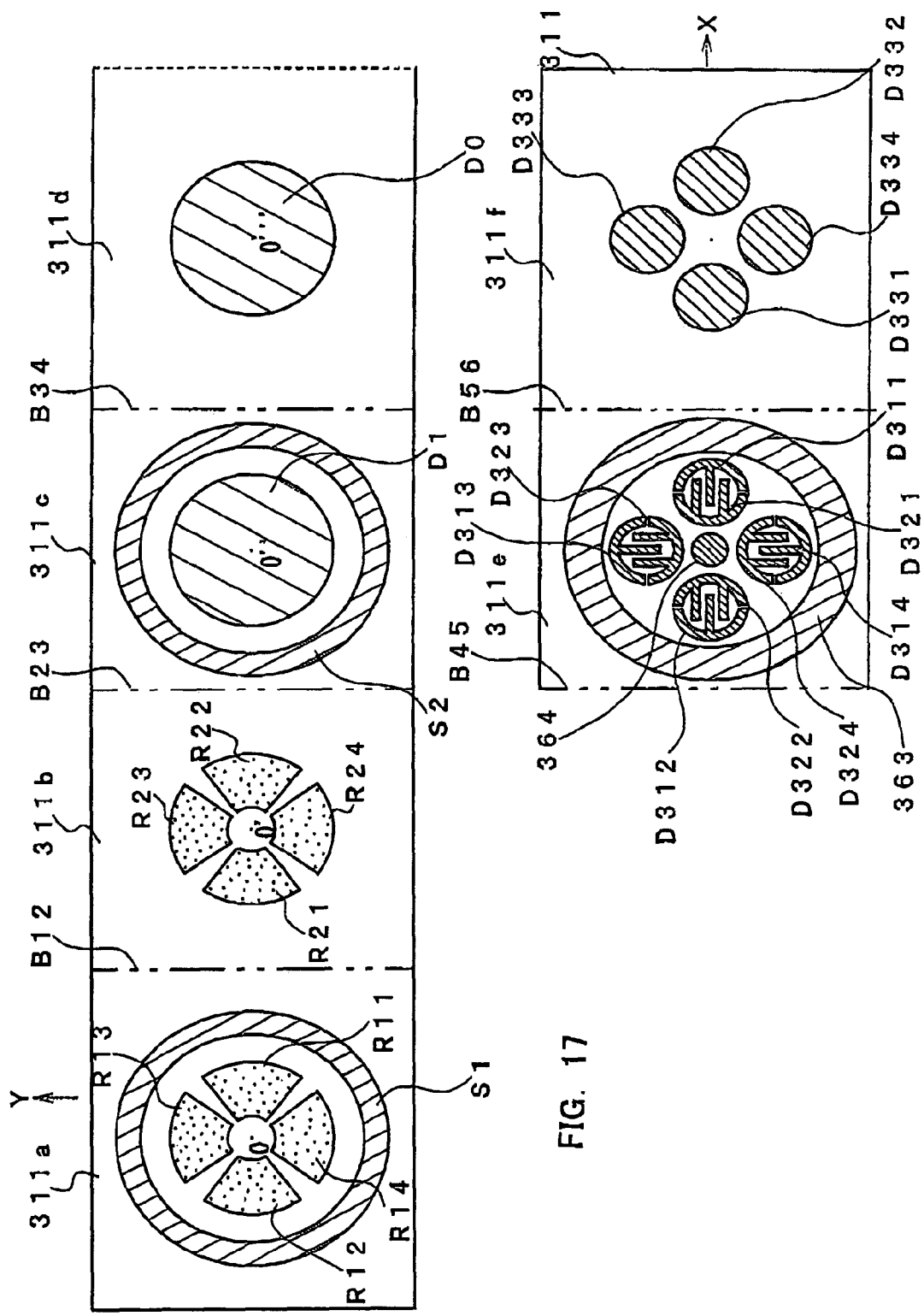
FIG. 17 is a view of an arrangement of a plurality of electrodes and spacers included in the resistance type sensor of FIG. 16.
Figure 18:
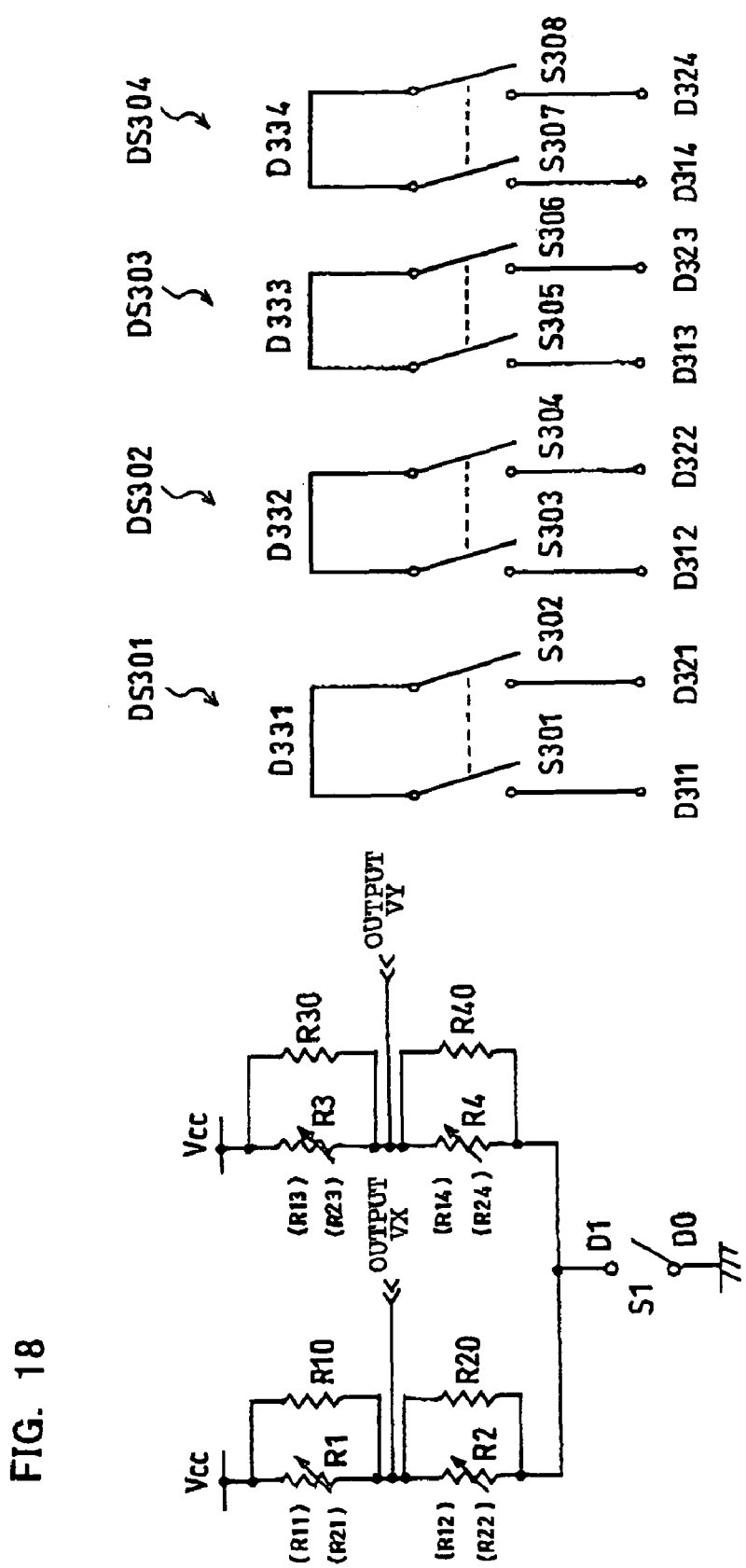
FIG. 18 is an example of the circuitry of the resistance type sensor shown in FIG. 16.

Thus, the resistance type sensor 201 of this embodiment provides the very convenient function for portable information devices, such as a mobile phone, having a severely limited area on operation panel and requiring analog voltage outputs corresponding to the X-axis positive direction, the X-axis negative direction, the Y-axis positive direction and the Y-axis negative direction and switch contact outputs corresponding to those four directions Next, the fourth embodiment of the present invention will be described with reference to the drawings. FIG. 16 is a schematic sectional view of a resistance type sensor according to the fourth embodiment of the present invention. FIG. 17 is a view of an arrangement of a plurality of electrodes and spacers included in the resistance type sensor of FIG. 16. FIG. 18 is an example of the circuitry of the resistance type sensor shown in FIG. 16.

Now, the detailed structure of the resistance type sensor 301 according to the fourth embodiment will be described with reference to FIGS. 16 and 17. The resistance type sensor 301 of FIG. 16 differs from the resistance type sensor 1 of FIG. 1 in that whereas the resistance type sensor 1 has the variable contact resistances R1–R4 and the wakeup switch S1 which are vertically arranged in two layers, the resistance type sensor 301 has the variable contact resistances R1–R4, the wakeup switch S1, and the domed switches DS301–DS304 which are vertically arranged in three layers. As the remaining constructions are the same as those of the resistance type sensor 1 of FIG. 1, the description thereon will be omitted, with like numerals given to like parts.

An FPC 311 incorporated in the resistance type sensor 301 is a flat-plate-like member of a generally rectangular shape and longer than th FPC 11 of the first embodiment, as shown in FIG. 17. A front surface of the FPC 311 (a front side of a paper as viewed in FIG. 17) is divided into a first surface 311a, a second surface 311b, a third surface 311c, a fourth surface 311d, a fifth surface 311, and a sixth surface 311f. The first surface 311a to the sixth surface 311f divided by boundary lines B12, B23, B34, B45 and B56 indicated by chain double-dashed lines in FIG. 17 have a generally square shape and substantially the same area. Each boundary line B12, B23, B34, B45 and B56 serves as a folding line along which the FPC 311 is folded.

As is the case with the first embodiment, the pressure-sensitive resistive inks R11–R14 and R21–R24 and the displacement electrodes D1 and D0 are formed on the first surface 311a to the fourth surface 311d. Also, the contact electrodes D311–D314 and D321–D324 and the displacement electrodes D331–D334 are formed on the fifth surface 311e and the sixth surface 311f, as is the case with the third embodiment.

Then, as is the case with the first embodiment, the FPC 311 is folded along the boundary lines B12, B23, B34, B45 and B56 between adjacent surfaces, to complete the sensor unit 310 as shown in FIG. 16. This produces the resistance type sensor 301 in which four variable contact resistances R1–R4 corresponding to the X-axis positive direction, the X-axis negative direction, the Y-axis positive direction and the Y-axis negative direction and the common wakeup switch S1 commonly used for the four directions mentioned above are formed by the pressure-sensitive resistive inks R11–R14 and R21–R24, the displacement electrodes D0, D1, the displacement electrodes D331–D334 and the contact electrodes D311–D314 and D321–D324. Further, there are provided the four domed switches DS301–DS304 (FIG. 18) corresponding to the four directions mentioned above.

As seen from the description above, the resistance type sensor 301 according to this embodiment can provide both of the effects of the first embodiment and the effects of the third embodiment.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

Although the sensor unit having the pressure-sensitive resistive inks and the displacement electrodes formed on the single FPC has been illustrated in the first to fourth embodiments described above, this construction is not limitative. The construction of the sensor unit may be modified arbitrarily. The pressure-sensitive inks and the displacement electrodes need not necessarily be formed on the substrate. Even when the pressure-sensitive inks and the displacement electrodes are formed on the substrate, all of them need not necessarily be formed on the single substrate. The substrates that may be used include a substrate lacking in flexibility, in addition to the FPC.

Although the sensor units arranged in two or three layers with respect to a vertical direction by arranging the variable contact resistances and the switch(s) (including th wakeup switch and/or the mere switch) to be opp site to each other have been illustrated in th first to fourth embodiments described above, this is not limitative. The variable contact resistances and the switch may be arranged not to be opp site to each other. Also, the sensor unit may be arranged in four or more layers with the variable contact resistances and three or more switches.

Although the sensor units multilayered in such a relation that the variable contact resistances are arranged in the undermost layer and the switch (including the wakeup switch and/or the mere switch) are arranged to be closer to the operating button than the variable contact resistances have been illustrated in the first to fourth embodiments described above, this is not limitative. The variable contact resistances need not necessarily be arranged in the undermost layer. The variable contact resistances and the switch may be placed in opposite arrangement. That is to say, the switch may be arranged in the undermost layer and the variable contact resistance may be arranged to be closer to the operating button than the switch.

Although the operation applied to the operating button that is performed in the order that after the domed switch is switched from the off-state to the on-state, the resistance values of the variable contact resistances are varied has been illustrated in the third embodiment described above, the operating order may be changed. That is to say, the operation may be performed in such an order that after the resistance values of the variable contact resistances are varied, the domed switch is switched from the off-state to the on-state or that at substantially the same time as th domed switch is switched from the off-state to the on-state, the resistance values of the variable contact resistances are varied. Also, these operation orders may be changed properly by adjusting strength (rigidity) of a member supporting the pressure-sensitive resistive inks and the displacement electrodes. Likewise, in the fourth embodiment, the timing of the domed switch being switched from the off-state to the on-state, the timing of the wakeup switch being switched from the off-state to the on-state, and the timing of the resistance values of the variable contact resistances being varied may be made inconsecutive or may be made substantially simultaneous. However, as for the timing of the wakeup switch being switched from the off-state to the on-state and the timing of the resistance values of the variable contact resistances, it is preferable that after the wakeup switch is switched from the off-state to the on-state, the resistance value of the variable contact resistances are varied.

Although the construction wherein the displacement electrode D0 is connected to ground and the displacement electrode D1 is held at the power-supply voltage Vcc has been illustrated in the first and fourth embodiments described above, this is not limitative. Modification may be made to this by connecting the displacement electrode D1 to ground and holding the displacement electrode D0 at the power-supply voltage Vcc. Although the arrangement wherein two displacement electrodes are formed on the third surface of the FPC has been illustrated in the third embodiment, this is not limitative. The displacement electrodes on the third surface of the FPC may be changed in number and shape arbitrarily.

Although the resistance type sensor capable of detecting two component of a force applied from outside for the X-axis direction and the Y-axis direction has been illustrated in the first to fourth embodiments described above, this is not limitative. The resistance type sensor of the invention may have the capability of detecting only a required component of the two components of the force mentioned above.

What is claimed is:

1. A resistance type sensor comprising:
  a detective member;
  a first electrode facing the detective member;
  a second electrode disposed between the detective member and the first electrode and facing the first electrode, wherein the second electrode is displaceable toward the first electrode in accordance with displacement of the detective member;
  a pressure-sensitive resistive member disposed between the first electrode and the second electrode;
  at least one first switching electrode disposed between the detective member and the second electrode and facing the detective member; and
  at least one second switching electrode disposed between the detective member and the first switching electrode, wherein the second switching electrode comes into contact with the first switching electrode in accordance with displacement of the detective member, and
  wherein the displacement of the detective member is identified on the basis of a detection of a change in resistance between the first electrode and the second electrode.

2. The resistance type sensor according to claim 1, further comprising:
  a first substrate mounting the first electrode thereon;
  a second substrate mounting the second electrode thereon;
  a first switching substrate mounting the first switching electrode thereon; and
  a second switching substrate mounting the second switching electrode thereon.

3. The resistance type sensor according to claim 2, wherein the first substrate, the second substrate, the first switching substrate, and the second switching substrate are formed by a single common substrate having flexibility.

4. The resistance type sensor according to claim 3, wherein the first electrode, the second electrode, the first switching electrode, and the second switching electrode are all arranged on one side of the common substrate.

5. The resistance type sensor according to claim 2, wherein the first switching electrode and the second switching electrode are disposed so as to overlap with the first electrode and the second electrode with respect to a displacement direction of the detective member.

6. The resistance type sensor according to claim 1, wherein the first switching electrode and the second switching electrode are disposed so as to overlap with the first electrode and the second electrode with respect to a displacement direction of the detective member.

7. The capacitance type sensor according to claim 1, wherein the first switching electrode and the second switching electrode are disposed to be closer to the detective member than the first electrode and the second electrode.

8. The resistance type sensor according to claim 7, wherein one of the first switching electrode and the second switching electrode is connected to ground and the other of the first switching electrode and the second switching electrode are held at different potential from ground potential, and wherein the first switching electrode and the second switching electrode come into contact with each other in accordance with the displacement of the detective member, whereby second electrode is displaced.

9. The resistance type sensor according to claim 1, wherein there are provided a plurality of pairs of the first electrodes and the second electrodes.

10. The resistance type sensor according to claim 1, wherein there are provided a plurality of pairs of the first switching electrodes and the second switching electrodes.

* * * * *